United States Patent
Alesiani et al.

(10) Patent No.: US 10,522,036 B2
(45) Date of Patent: Dec. 31, 2019

(54) METHOD FOR ROBUST CONTROL OF A MACHINE LEARNING SYSTEM AND ROBUST CONTROL SYSTEM

(71) Applicant: NEC Laboratories Europe GmbH, Heidelberg (DE)

(72) Inventors: Francesco Alesiani, Heidelberg (DE); Konstantinos Gkiotsalitis, Frankfurt (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/911,212

(22) Filed: Mar. 5, 2018

(65) Prior Publication Data
US 2019/0272752 A1    Sep. 5, 2019

(51) Int. Cl.
*G08G 1/123* (2006.01)
*G08G 1/01* (2006.01)
*G06N 20/00* (2019.01)

(52) U.S. Cl.
CPC .......... *G08G 1/123* (2013.01); *G06N 20/00* (2019.01); *G08G 1/0129* (2013.01); *G08G 1/0137* (2013.01)

(58) Field of Classification Search
CPC .... G08G 1/123; G08G 1/1029; G08G 1/1037; G06N 20/00
See application file for complete search history.

(56) References Cited

PUBLICATIONS

Madan et al., Ameliorating Metaheuristic in Optimization Domains, 2009, IEEE, p. 160-163 (Year: 2009).*
Bambha et al., Systematic integration of parameterized local search into evolutionary algorithms, 2004, IEEE, p. 137-155 (Year: 2004).*
Kerrigan et al., Computer architectures to close the loop in real-time optimization, 2015, IEEE, p. 4597-4611 (Year: 2015).*
Mitra et al., Phase-aware optimization in approximate computing, 2017, IEEE, p. 185-196 (Year: 2017).*
Cho et al., A Survey on Modeling and Optimizing Multi-Objective Systems, 2017, IEEE, p. 1867-1901 (Year: 2017).*
Kerrigan, Co-design of hardware and algorithms for real-time optimization, 2014, IEEE, p. 2484-2489 (Year: 2014).*
Moore et al., l1-optimal robust iterative learning controller design, 2008, IEEE, p. 3881-3886 (Year: 2008).*

(Continued)

*Primary Examiner* — McDieunel Marc
(74) *Attorney, Agent, or Firm* — Leydig, Voit & Mayer, Ltd.

(57) ABSTRACT

A method for robust machine learning of a target system includes determining a disturbance budget and defining an optimization problem based on the disturbance budget. Input data is provided iteratively to the target system. The input data at a current iteration is an integrated solution of a previous iteration. A disturbance is generated iteratively. The disturbance at the current iteration is generated according to the disturbance budget and the input data at the current iteration. An optimal solution of the target system is generated iteratively. The optimal solution of the target system at the current iteration is generated based on the disturbance and the input data at the current iteration. The input data at the current iteration is integrated with the optimal solution of the target system at the current iteration to obtain an integrated solution of the current iteration.

15 Claims, 11 Drawing Sheets

(56) References Cited

PUBLICATIONS

Nasiri, An Optimal Iterative Learning Control for Continuous-Time Systems, 2007, IEEE, p. 114-119 (Year: 2007).*

Dimitris Bertsimas, et al., "Characterization of the equivalence of robustification and regularization in linear and matrix regression", Statistics Theory, arXiv:1411.6160, Nov. 22, 2014, pp. 1-39.

L. Jeff Hong, et al., "Learning-based Robust Optimization: Procedures and Statistical Guarantees", arXiv:1704.04342v1, Apr. 14, 2017, pp. 1-40.

Theja Tulabhandula, et al., "Robust Optimization using Machine Learning for Uncertainty Sets", arXiv:1407.1097v1, Jul. 4, 2014, pp. 1-28.

* cited by examiner

Table 1: Performance of the daily operations when following the Optimal Timetable or the *Robust Speed Profiling Approach* in 1,000 simulations

| 1,000 simulations of the daily operations with random travel time and passenger demand noise | Average Passenger Waiting Time Variation (min.) | St.Dev. of the Passenger Waiting Time (min.) |
|---|---|---|
| Performance of the daily operations following the Optimal Timetable (SoA) | 2.347 | 0.517 |
| Performance of the daily operations following the Robust Speed Profiling | 2.252 (4.1% improvement) | 0.514 (0.5% improvement) |

FIG. 8

1: function SQP $(z(\mathbf{h}), c_1(\mathbf{h}), ..., c_m(\mathbf{h}), E, I)$
2:     With an *initial guess* of planned headways and Lagrange multipliers choose an initial iteration pair $(\mathbf{h}_k, \lambda_k)$;
3:     Set $k \leftarrow 0$;
4:     while a convergence text is satisfied or the total number of iterations is reached do
5:         Compute $z(\mathbf{h}_k), \nabla z(\mathbf{h}_k)^T, \nabla^2_{hh}\mathcal{L}(\mathbf{h}_k, \lambda_k), J(\mathbf{h})^T, c(\mathbf{h}_k)$, where $c$ is vector of $m$ elements;
6:         Solve the Inequality_QP$(z(\mathbf{h}), \nabla^2_{hh}\mathcal{L}(\mathbf{h}_k, \lambda_k), \nabla z(\mathbf{h}_k)^T, E, I, J(\mathbf{h}_k)^T, -c(\mathbf{h}_k))$ sub-problem:
7:             $\min_{p \in \mathbb{R}^L} z(\mathbf{h}_k) + \nabla z(\mathbf{h}_k)^T p + \tfrac{1}{2} p \nabla^2_{hh}\mathcal{L}(\mathbf{h}_k, \lambda_k) p$
8:             subject to $J(\mathbf{h}_k)p + c(\mathbf{h}_k) \geq 0$
9:         Inequality QP function returns solution pair $(pk, \lambda_{k+1})$
10:        Set $(\mathbf{h}_{k+1}, \lambda_{k+1}) \leftarrow (\mathbf{h}_k + pk, \lambda_{k+1})$
11:    end while
12:    return optimal solution $\mathbf{h}^*$ and the objective function value $z(\mathbf{h}^*)$;
13: end function

FIG. 9

1: function MASKUPDATE($m_{ns}$, $p_{ns}$, $s_{ns}$, $c_{ns}$, $v_{sn}$, $n_{ns}$, $K$, $k$)
2:     Select the index of the variable $I \leftarrow$ Select Variable($p_{ns}$, $K$, $p_{min}$)
3:     let's define $f$, $h$, $g$, the values of the cost function and the constraints
4:     solve $\min_{ns \in I, x, h(x) \geq 0, g(x)=0} f(x)$
5:     $\forall ns \in I$
6:     $m_{ns} = 1$
7:     $p_{ns}$ = UpdateProbability($f$, $h$, $g$, $m_{ns}$, $p_{ns}$, $s_{ns}$, $c_{ns}$, $v_{sn}$, $n_{ns}$, $K$)
8:     $s_{ns}$ = std($f$, $s_{ns}$, $c_{ns}$, $n_{ns}$)
9:     $c_{ns}$ = mean($f$, $s_{ns}$, $c_{ns}$, $n_{ns}$)
10:    $v_{sn}$ = mean($h$, $g$, $v_{ns}$, $n_{ns}$)
11:    $n_{ns} = n_{ns} + 1$
12:    $p_{min}$ = ReduceMinProbability ($p_{min}$, $k$)
13: end function

1: function SELECTVARIABLE($p_{ns}$, $K$, $p_{min}$)
2:     $I \leftarrow \{\}$
3:     while True do
4:         $ns \leftarrow$ Random($N$, $S$), select randomly $ns$
5:         if $ns \notin I$ then
6:             $p' \leftarrow$ Random01(), select randomly in the interval [0,1]
7:             if $p_{ns} \geq p'$ or $p' \leq p_{min}$ then, $p_{min}$ is the probability to still select the variable
8:                 $I \leftarrow I \cup \{ns\}$, add the index in the selection set
9:                 if $|I| = K$ then
10:                     return $I$, return if the number of elements are $K$
11:                 end if
12:             end if
13:         end if
14:     end while
15:     ...
16: end function

1: function UPDATEPROBABILTY($f$, $h$, $g$, $m_{ns}$, $p_{ns}$, $s_{ns}$, $c_{ns}$, $v_{sn}$, $n_{ns}$, $K$)
2:     do some mixing up of parameters...
3: end function

FIG. 11

METHOD FOR ROBUST CONTROL OF A MACHINE LEARNING SYSTEM AND ROBUST CONTROL SYSTEM

FIELD

The present invention relates to determining robust solution to machine learning problems where disturbance to the robust solution is bounded. The present invention also relates to determining robust solutions for bus holding problems.

BACKGROUND

The rapid adoption of telematic and fare collection systems from bus operators has enhanced monitoring of bus operations and can potentially improve reliability of transit services. For instance, Automated Vehicle Location (AVL) systems have been broadly deployed and used for monitoring the daily operations since the late 1990s. Owing to the adoption of telematics and fare collection systems, public transport authorities can evaluate the performance of bus operators based on concrete metrics such as the excess waiting times (EWTs) of passengers at stops, the punctual adherence to the planned schedules, the total number of vehicle kilometers traveled, and many more. Early assessments can be found in Strathman et al., "Evaluation of Transit Operations: Data Applications of Tri-Met's Automated Bus Dispatching system," Transportation (2002), where the Tri-Met's automated bus dispatching system was evaluated using AVL and partial Automated Passenger Counting (APC) data.

Recently, public transport authorities have started using information from telematics and fare collection systems for penalizing bad-performing bus operators and rewarding the best-performing ones using direct monetary incentives. As an example, the introduced Bus Service Reliability Framework (BSRF) in Singapore incentivizes the bus operators by providing 2,000 Singaporean dollars per month for every 0.1 minute improvement of the passenger EWTs. This has motivated bus operators to improve their daily operations by analyzing the generated AVL and AFC datasets or new forms of user-generated data such as social media data or cellular data.

Apart from the analysis of data, this pressure has started to affect the strategic planning which determines the design of the network routes and the tactical planning which consists of the (i) frequency setting; (ii) timetable design and (iii) vehicle and crew scheduling. For instance, reliable frequencies for the bus services can be set using insights from operational AVL and AFC data, and data-driven timetables can be developed using smartcard records generated when passengers board and alight at buses. Besides strategic and tactical planning, bus operators are in need of also improving their operational planning. For instance, bus operators occasionally deploy a variety of near 33 real-time control measures, such as stop-skipping, bus holding at stops, and short-turnings for performing corrective actions when actual operations deviate significantly from the planned schedules. Nevertheless, these corrective measures can cause undesirable secondary effects, such as the increase of in-vehicle travel times due to bus holdings at stops, the increase of deadheading times due to short-turnings, and the increase of passenger inconvenience due to stop-skipping. In addition, such control measures can affect crew schedules, vehicle allocation, or result in "schedule sliding."

The EWT has its roots to the definition of the Actual Waiting Times (AWT) of passengers at stops. The AWT links the waiting time of passengers at stops with the headways of successive bus trips by assuming that the passenger arrivals at stops are random and therefore the AWT is equal to half the average headway at one stop plus the ratio of the headway variance at that stop to twice the average headway. The EWT is equal to the AWT of passengers at each stop minus the Scheduled Waiting Times (SWT) of passengers at those stops and is widely used by several transport authorities for monitoring purposes (such as Transport for London (TfL) and the Land Transport Authority (LTA) in Singapore).

This pressure from the transport authorities has forced bus operators to introduce a variety of control measures such as bus holding at stops, stop-skipping, short-turnings and more. Reflecting to that, extensive research in this field has tried to provide answers to questions such as which control measures are the most effective, how can control measures be automated, how can operational constraints related to labor and fleet size limitations be satisfied, and how can stochastic nature of the bus operations be modelled? Some conventional methods acknowledge that given the stochastic nature of the bus operations, there might be a need for applying corrective measures such as bus holdings, stop-skipping, etc., during the operational phase. Thus, these methods proactively embed slack times in daily trips in order to add flexibility during the operations. Introducing long slack times though requires more buses for maintaining the same service frequency.

Conventional methods relating to timetable optimization strive to ensure that the departure times of trips are evenly spaced. For instance, a desired even load level can be a target for all running buses at the maximum loading point of trips with the determination of dispatching times for bus trips that do not lead to significant deviations from the desired even headways. The desired even headways are inversely proportional to the predefined line frequencies determined during the frequency settings stage. Generating timetables with evenly spaced departure times can be combined with the additional objective of synchronizing passenger transfers.

Timetable optimization can also be performed by categorization into methods using deterministic travel times and dwell times during the optimization process and method using stochastic travel times and dwell times. Stochastic travel times have been considered for operational control for deriving dynamic bus holding strategies in order to improve the adherence of the operations to the planned schedule. An analytic bus holding model that considers the stochastic nature of vehicle running times and passenger boarding and alightings has been developed by Hickman, "An analytic stochastic model for the transit vehicle holding problem," Transportation Science (2001).

Conventional methods have proposed simultaneous optimization of bus frequencies and timetables. Additionally, trying to simultaneously determine the route network design, the bus frequencies and the timetable assignment by integrating the strategic and tactical planning phases has been proposed. Conventional methods also attempted decoupling frequency settings problem from the timetabling problem to obtain their solution in a sequential order. Timetable synchronization for developing bus timetables that are synchronized with the rail timetables or other bus timetables has also been proposed. Conventional methods have also developed flexible timetables that provide some buffer time at synchronization points (i.e., passenger transfer stops) in case there is a deviation between the actual and the 74 planned arrival time of any of the bus trips at the transfer stop.

Several studies control only the running and ignore the implications of the computed bus holdings to the next trips that will be operated by the same buses. Two of the most common bus holding strategies are: (i) the one-headway-based control where a bus is held at a bus stop (called also control point if bus holding is allowed only at a limited number of stops) if it is too close to its preceding bus for a time period such that its departure time is equal to the departure time of its preceding trip plus the planned headway between them, and (ii) the two-headway-based control where that estimates also the arrival time of the following bus at the same stop and considers the headways between the preceding and the following bus when computing a holding time.

In conventional methods, stochasticity is introduced at the single holding problem by modeling it as a convex quadratic program in a single variable for including stochasticity at the vehicle running times and passenger boarding and alightings. Also in conventional methods, an approach that tries to hold the buses at specific stops in order to normalize the headways instead of satisfying a specific headway target; thus, resulting to smoother holdings in case of severe traffic disruptions. However, these real-time holding strategies are heuristic in nature and cannot guarantee an improvement in the operations. For this reason, such strategies have been extensively validated with simulations that use normal and lognormal distributions for introducing stochasticity to the link travel times and approximate the effect of the signal control and the traffic congestion. Given their drawback on performing optimizations at the local level, they require high slack times at the scheduling phase for reducing the adverse effects of the bus trips delays due to the bus holding to the future trips.

Also in conventional methods, an approach that tries to minimize the amount of slack time in the schedule instead of trying to minimize the passenger waiting times with local-level optimizations is provided. Those works also considered the headway variability during the day and introduced noise at the link travel times with the use of the normal distribution in order to validate the performance of their holding measures in different scenarios.

The bus holding problem can also be viewed as a rolling-horizon optimization problem. For this case, the minimization of passenger waiting times can be modeled as a deterministic quadratic program. In addition, the operational constraints can also be considered in the formulation of the bus holding problem and acknowledging that every holding time strategy can have an adverse effect to resource limitations related to labor and fleet numbers. Rolling horizon optimization approaches are able to eliminate the slack time requirement from the schedules because they can optimize the bus holding times of a set of buses (i.e., from all the daily bus trips of a service) at the same time.

SUMMARY

In an embodiment, a method for robust machine learning of a target system. A type of optimization problem and parametrization for solving the optimization problem are determined. A disturbance budget is determined based on a disturbance modeling. The optimization problem is defined based on the disturbance budget. An initial integrated solution is determined for iteratively solving the optimization problem. Input data is provided iteratively to the target system, wherein the input data at a current iteration is an integrated solution of a previous iteration. A disturbance is generated iteratively, wherein the disturbance at the current iteration is generated according to the disturbance budget and the input data at the current iteration. An optimal solution of the target system is generated iteratively, wherein the optimal solution of the target system at the current iteration is generated based on the disturbance and the input data at the current iteration. The input data at the current iteration is integrated with the optimal solution of the target system at the current iteration to obtain an integrated solution of the current iteration.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 8 illustrates simulation results according to an embodiment of the invention FIG. 9 illustrates an iterative algorithm according to an embodiment of the invention;

FIG. 11 illustrates pseudocode for mask updates, variable selection, and probability updates.

DETAILED DESCRIPTION

Figure 1:
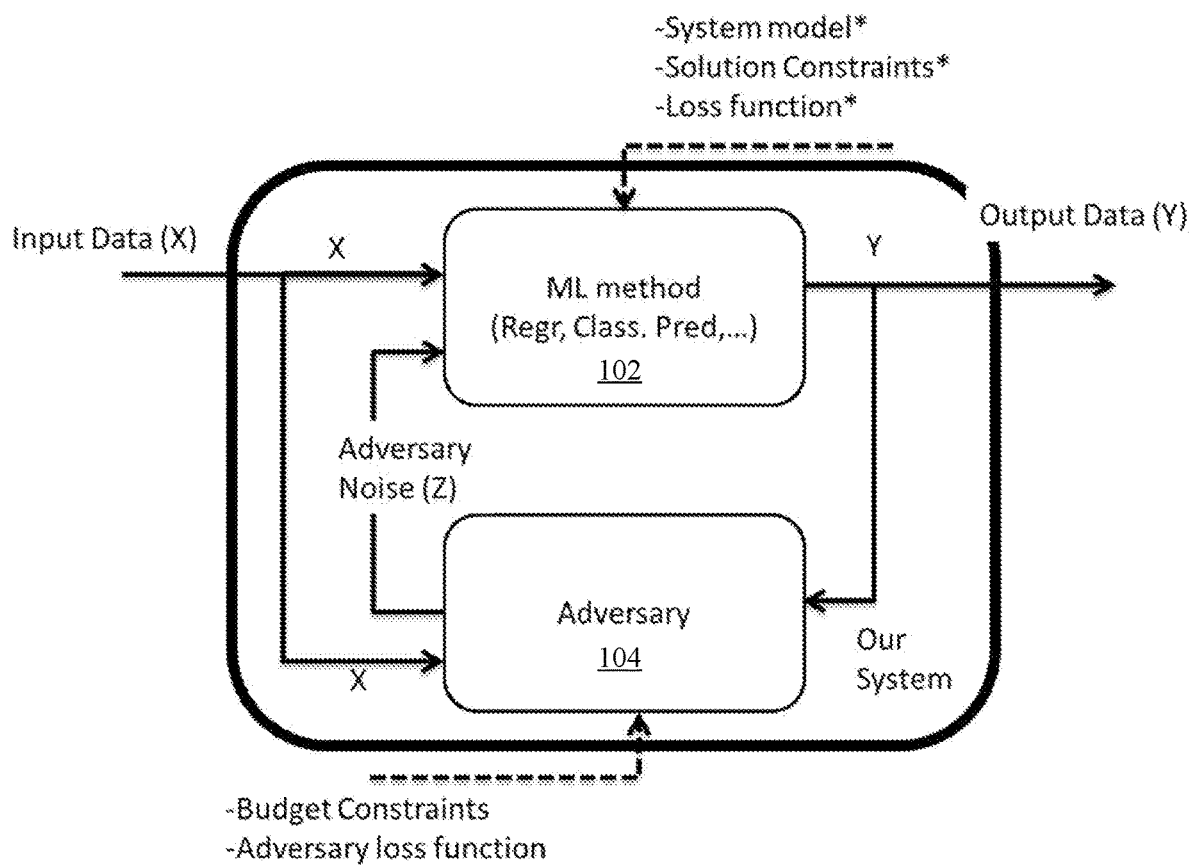
FIG. 1 illustrates a control system according to embodiments of the invention.

By considering all the planned bus trips when computing the bus holding times, and not only the preceding and the following trip of each examined bus, the optimization process can analyze many more bus holding options that were counter-productive and not considered at the local-level optimization of headways between consecutive trips. This can provide a great benefit because it allows to monitor the effect of holding times to operational constraints and to future trips that have not departed yet; thus, eliminating the need to add slack times to every trip. The main drawback of such methods though is the problem complexity because of the considered interdependence between all trips that prohibits their application in real-time. Therefore, most studies that evaluate the performance of the bus holding stops resort to simulations that try to select bus holding strategies without optimizing the entire daily operations. In contrary, studies that use rolling horizon optimization for computing bus holding times for trips considering their interdependence with other trips that might have not departed yet make strong assumptions for reducing the computational costs (such as deterministic link travel times or ignoring the effect of bus holding measures to the travel times of trips). Those unrealistic assumptions lead to the computation of bus holding times that might not improve the performance of the bus operations in case of strong disruptions and travel time variations during the day.

Embodiments of the disclosure provide an approach to the bus holding problem in a hybrid form by considering both the robust planning of dispatching and holding times and their real-time updates where the slack times are bounded due to the limitations imposed by the robust plan. While bus and other transit operations are one particular application to which embodiments of the present invention can provide improvements, further embodiments of the present invention can be used to provide robust machine learning systems in other fields and particular applications as discussed herein.

Machine learning is the area of design methods that provides data driven solutions to classification, regression, prediction or decision systems. Those systems are designed to minimize a prescribed loss function, for example the mean square error in case of prediction or regression error, some norm or cross entropy for classification problems. Machine learning provides a solution that generalizes the result for unseen cases, but it may be very sensitive to input noise in both the training and testing phases. A way to address this problem is to regularize the target loss so that it weights also the model parameters. This way thought is not possible to understand the behaviour in more specific situations.

Embodiments of the invention provide a method to generate machine learning methods that are robust to variation in the underlying system. The embodiments address the problem of providing a solution that is robust to changes in the input data or in the underlying unknown model. The embodiments address the problem of considering corruption on the system that is somehow limited and improve both the machine learning output and the adversary system (which is a system of external disturbances). The embodiments are applied to control physical entities, as control system for buses or enforcement control system for fraud detection and reduction.

Compared to conventional methods, embodiments of the invention generate control solutions that include errors in the model, so that when the solutions are applied to a control system, the control system provides robust performances.

Embodiments of the invention disclose a machine learning method that provides a robust solution when applied to a system affected by error or an external source of disturbances. The robust solution considers disturbance to the system that has some limitation in amplitude or energy (budget). The method uses the function and constraints of the system for the definition of the problem and includes a learning process based on a system of external disturbances with learned boundaries.

Embodiments of the invention define an external disturbance system that generates a disturbance on the system under optimization. This disturbance depends on the current found solution and the embodiments iteratively improve performance against the external disturbance. At the same time the adversary (external disturbance) improves its performance according to a complementary cost function. In this way the final solution is robust to an expert adversary system. Both systems are learned from the input data set.

FIG. 1 illustrates a control system according to embodiments of the invention. The control system consists of two sub-systems. The two sub-systems can be implemented on computers with one or more processors and one or more non-transitory computer readable media. The computers receive one or more input data X and provide one or more output data Y. The two sub-systems are the machine learning system (ML method in FIG. 1) and the adversary. The ML system 102 provides the optimal solution for the input data X. The adversary 104 (or external disturbance system) provides an input data or noise to the ML system 102 to disturb system constraints at some budget. The control system further includes within the two sub-systems a function that integrates the solution when the control system is solved iteratively. In some embodiments, an integration function is provided that does not violate constraints of the control system if provided. In some embodiments, the ML system 102 considers system models and/or constraints when provided.

In some embodiments, the ML system 102 considers a loss function when provided. The target system is a ML method that learns from the input data which are disturbed by the external disturbance system 104. The ML method finds the optimal solution according to some loss function. The ML system 102 mimics or models a control system of interest. Embodiments of the invention learn input-output relationships when the control system of interest is affected by disturbance bounded by a disturbance budget, and the ML system 102 is trained according to the disturbance.

The external disturbance system (or adversary 104) generates the disturbance or noise, taking as input the current solution and providing a change that is bounded according to the disturbance budget. The external disturbance system is equipped with some budget or constraint that is to be met and not exceeded. The budget is defined in terms of norm of the provided error (e.g. $\|Z\|<B$ is bounded) or statistically, where the statistic description is finite, for example $Z \sim N(m, S)$, where N is a Gaussian noise, and m and S are the mean vector and covariance matrix. The boundaries of the external disturbance system is computed by analyzing the statistics of the input data through supervised learning in order to limit the changes that the external disturbance system can introduce to one of the input data.

In an embodiment, the bounds of the disturbance budget are determined based on historical data input. For example, from historical data, the travel time of a bus trip varies from X to X' minutes where X is the lower bound and X' the upper bound. In other words, the budget bounds are not random, but receive specific values after analyzing historical data.

In an embodiment, the disturbance budget is learned from an actual system and input data to the actual system. The disturbance to the system is limited in some sense, and this disturbance model (or budget) is determined either from previous knowledge (historical data) or by applying machine learning. For example, in bus holding, the mean and variance of the disturbance can be learned via Support Vector Machine (SVM) regression. In an embodiment, the disturbance budget is improved over one or more iterations, i.e., a dependence of the disturbance on the system output is learned.

Every time a new solution of the machine learning problem is generated, the adversary 104 (external disturbance) produces the disturbance or noise. The new solution is integrated with the previous one based on the given constraints. The integration occurs sequentially and follows a conservative adoption of the newly computed solution. The adversary 104 (external disturbance) may also improve its performance iteratively according to an adversary loss function.

An example of a solution that the control system can provide is the solution to a min-max problem or worst case robustness. The solution Y is one that minimizes the maximum loss under the budgetary constraint.

Figure 2:
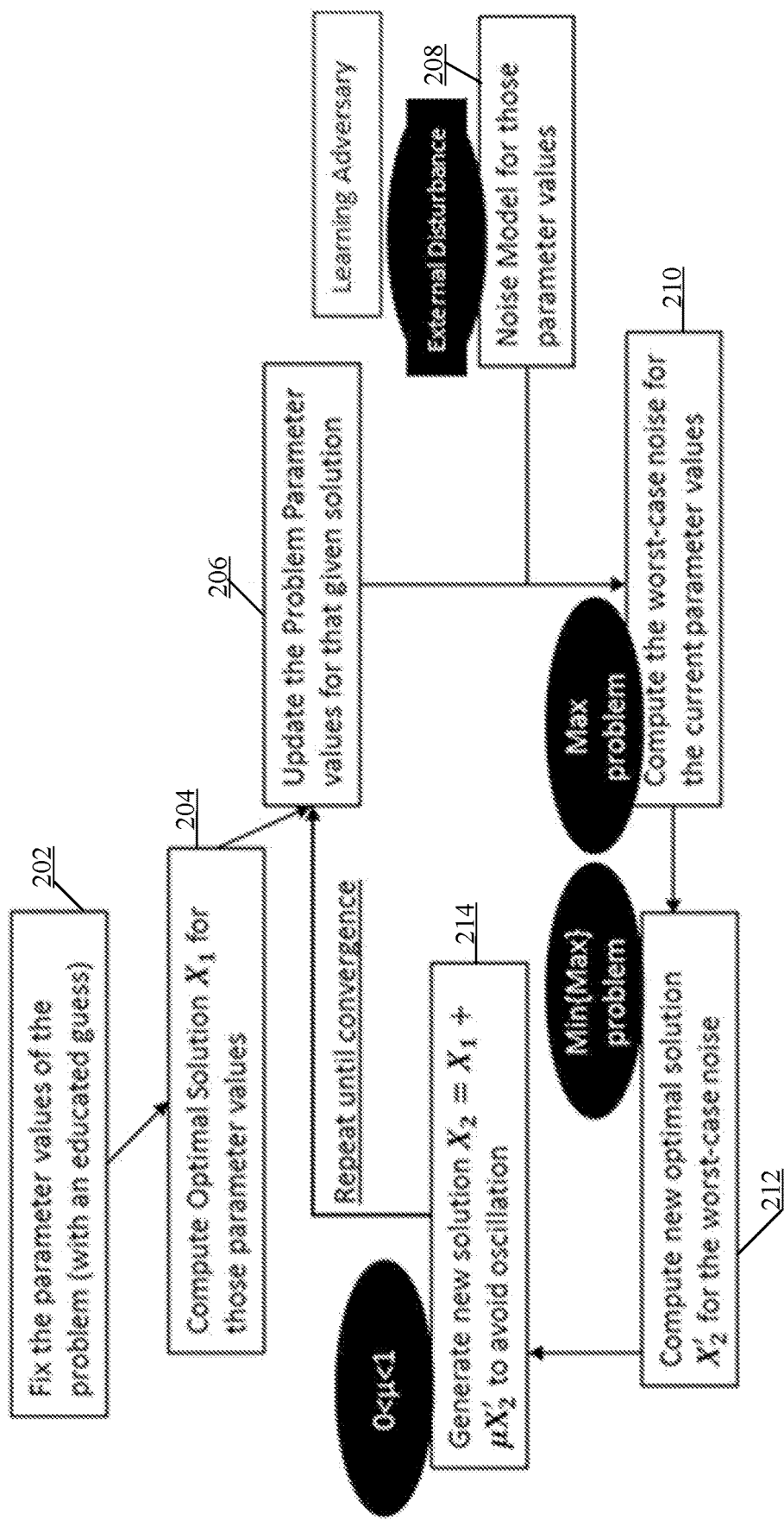
FIG. 2 illustrates a flow diagram according to an embodiment of the invention.

In an embodiment, the system under study can be described with a model that is provided to the ML method in order minimize the loss function. A loss function that is consistent with the problem can be provided. FIG. 2 illustrates a flow diagram according to an embodiment of the invention.

At step 202, relax the problem randomness by fixing the values of the problem parameters with an educated guess. In this step, initial values are provided. In an initial state, the ML system 102 may have no disturbance inputs from the adversary 104. For example, the travel time of a bus trip is a problem parameter. If the dispatching time of the bus trip (where the dispatching time change is a decision variable) changes, then the value of the travel time parameter is expected to change because the bus trips is shifted to another time period of the day. One way to determine the initial values of the problem parameters is to select some random values for the decision variables (i.e., select when each daily bus trip will depart) and use the expected travel time of each trip for its assigned departure time.

At step 204, using the problem parameters of step 202, the ML system 102 solves the problem for the noise-free case by computing a solution $X_1$. For example, if the travel time of a bus trip is a problem parameter, then the dispatching time of the bus trip is a decision variable that can be solved for. The solution $X_1$ is then the solution to the dispatching time given the travel time.

At step 206, for solution $X_1$ compute the problem parameter values. The solution $X_1$ obtained in step 204 is used to determine problem parameter values. For example, after obtaining the solution to the dispatching time given the travel time, the dispatching time is then used to determine travel time. So far, fix problem parameters at step 202, then use the fixed problem parameters to determine a solution for decision variables at step 204, and then use the solution for decision variables to find new problem parameters at step 206.

At step 208, the adversary 104 (or external disturbance system) generates noise for those parameter values computed at step 206. In an embodiment, the adversary 104 generates noise based on a noise model that is learned from historical data. In an embodiment, the noise model is learned using supervised learning or a statistical distribution that adequately represents historical data inputs. In an embodiment, different problem parameters affect the noise model differently and thus, the noise model is updated as problem parameters are updated.

At step 210, the adversary 104 computes the worst-case noise. For a given solution, a set of parameter values (step 206) and a noise model (step 208) exist. The worst-case noise for that given solution is obtained by solving a maximization problem that determines the worst-possible parameter values that will increase the performance of the objective function as much as possible. In the bus trip example, the adversary 104 determines the travel time disturbance from the noise models that will increase waiting times of passengers at stops as much as possible. Problem parameters that provide worst noise are then identified.

At step 212, the ML system 102 computes optimal solution $X'_2$ under that worst-case noise. New decision variables are determined (i.e., new departure times for the bus trips) that will minimize waiting times of passengers for that noise.

At step 214, the ML system 102 may not update solution $X_1$ with $X'_2$ due to potential oscillations that may be associated with the solution. The oscillations may be due to the significant change of the parameter values at every solution update. Instead, the ML system 102 uses solution $X'_2$ to provide a next step direction with line search by using a multiplier $0<\mu<1$ such that $X_2=X_1+\mu X'_2$. This update may be thought of as an integration with the next solution being the previous solution increased or decreased by a fraction of the optimal solution.

In an embodiment, ML system 102 iteratively selects the multiplier to avoid oscillation. By starting from a very conservative value where $\mu$ is almost equal to zero, the ML system 102 determines previous solutions are not improving, the value of $\mu$ is increased gradually. The ML system 102 effectively performs a "line search" method which is used for making small steps towards the optimal solution instead of jumping to it. This learning of $\mu$ indicates that the ML system 102 can be trained for different problems or applications. Different problems can have different requirements, thus embodiments of the invention determine the optimal value of $\mu$ iteratively.

When a new solution $X'_2$ is obtained, it does not replace the previous solution $X_1$. In contrary, the past and the current solutions are integrated using a multiplier $0<\mu<1$ such that $X_2=X_1+\mu X'_2$ where $X_2$ is the updated solution that integrates $X_1$ and $X'_2$. The factor that affects the integration of the new solution to the previous ones is the multiplier $\mu$. If the multiplier $\mu$ is close to zero, then the new solution will not significantly impact the previous solutions and the integration of the new solution will be very conservative. On the other hand, if $\mu$ has a high value then the new solution will significantly impact the historical solutions (something that can cause oscillations if solutions that are computed consecutively are very different). All in all, a successful integration of a new solution with past ones depends on the optimal selection of the value $\mu$. This is a sub-problem by itself. In an embodiment, the selection of the optimal value of $\mu$ is not based on a model. For instance, one might start with a very small value of $\mu$ and if he/she sees that the past solutions are not improved at all by the new solutions, he/she can increase gradually the value of $\mu$.

Figure 3:
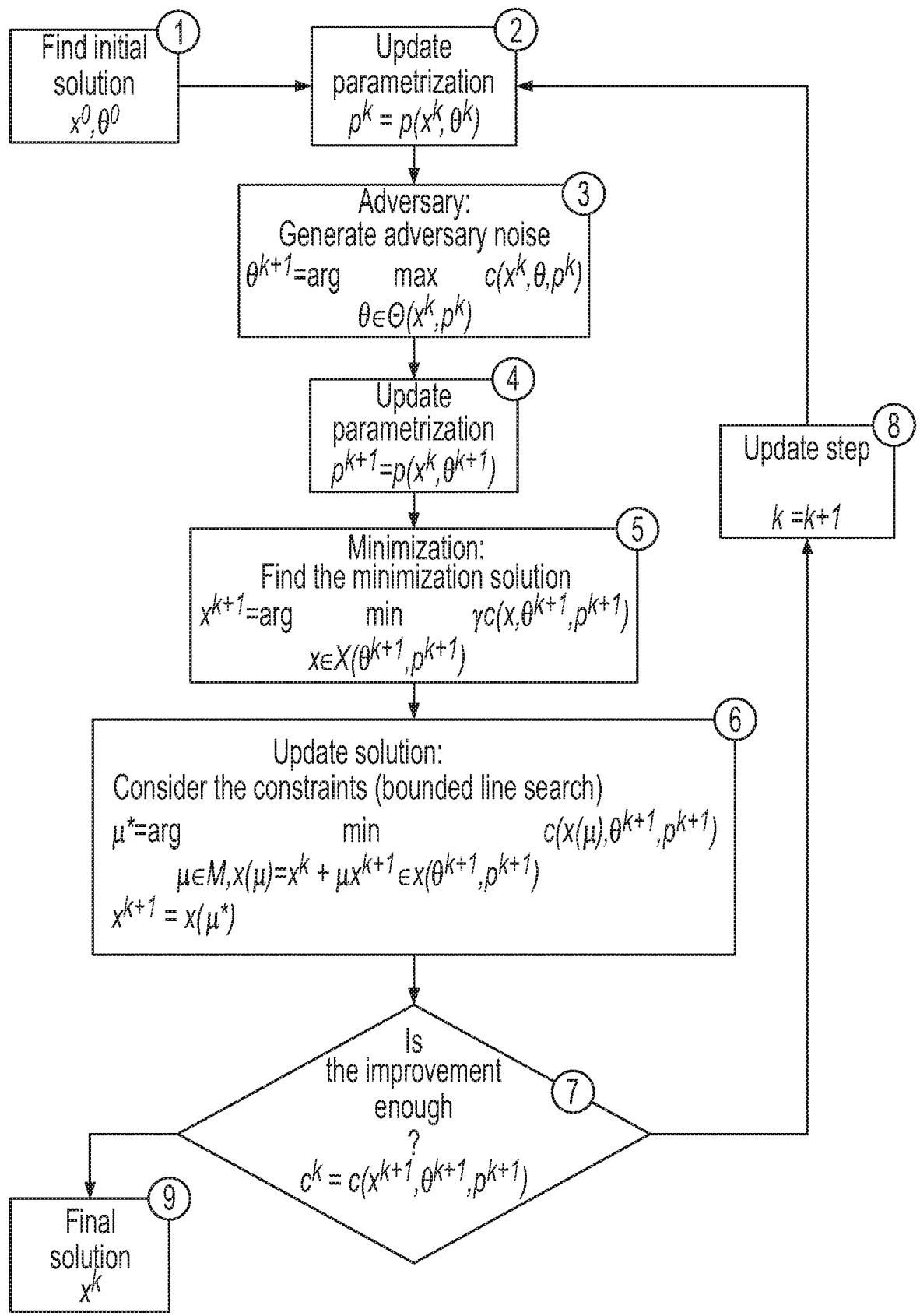
FIG. 3 illustrates a flow diagram according to an embodiment of the invention.

The flow diagram of FIG. 2 is represented mathematically in the flow diagram of FIG. 3. In FIG. 3, a parametrization of the system to be mimicked by the ML system 102 is identified, such that the problem simplified using the parametrization.

In FIG. 3, an initial solution (1) is determined. The initial solution in item (1) may be determined as already discussed with respect to an initial value or may be a previous solution from an iteration of the flow diagram of FIG. 2. Model parameters are then updated for the given solution items (2) and (4) in FIG. 3. A worst budgeted noise item (3) in FIG. 3 is determined. A best solution is determined having fixed noise and parameters in item (5). The solution is updated with bounded variation and considering constraints in item (6). Using the path along item (8), the steps are iterated until the successive solutions are improved enough and a final solution is settled on at item (9).

FIG. 3 provides a mathematical overview where an initial solution item (1) is used to update parameters of the ML system 102 item (2). Using the parameters of the ML system 102, a maximum noise is determined at item (3) by the adversary 104 and the conditions that are used to produce the maximum noise are used to update the parameters of the ML system 102 at item (4). Using the updated parameters of the ML system 102 that provide the worst case noise, at item (5), parameters of an optimal solution that minimizes a cost function are determined. At item (6), the initial solution is updated using the optimal solution of item (5) to find a new solution. Using the path along item (8), the steps are iterated until the successive solutions are improved enough and a final solution is settled on at item (9).

When considering FIG. 3, the problem with parametrization can be written as:

$$x^* = \arg \min_{x \in X(\theta, p(x,\theta))} \max_{\theta \in \Theta(x, p(x,\theta))} c(x, \theta, p(x, \theta)),$$

where c is the cost function, X is the set of constraints of the model, $\Theta$ is the budget (lower and upper boundaries) of the external disturbance, p is parametrization, $\theta$ is the noise, and x is the solution. Thus, considering FIG. 3, for each iteration, a current solution is used to determine problem parameters. The problem parameters are then used to determine a worst case noise. Conditions that elicit the worst case noise are used to update problem parameters which are then used in determining an optimal solution. A fraction of the optimal solution is then used to update the current solution to obtain a new solution.

Embodiments of the invention as provided in FIGS. 1-3 provide a solution that is robust to changes in the underlying system. The output of the overall system is based on this solution to provide a control measure that changes the actual behavior of the system and keeps the system's performance close to its optimal value when external changes are present. The modelling can be used in, for example, systems for bus control via holding or systems for fraud reduction system.

In embodiments, the adversary 104 (or external disturbance system) can generate the disturbance or noise in alternative ways, item (3) of FIG. 3. Based on the previous solution, the external disturbance system can provide the maximal disturbance possible according to the budget or constraint. The external disturbance system can also statistically generate the disturbance that has a distribution that obeys the budget constraint. The external disturbance system can use a way to define rules that link the solution (Y) to the input noise (Z), where the rules are part of the learning process.

In an embodiment, the minimization function in item (6) and/or the maximization of item (3) of FIG. 3 is defined by the gradient, so the solution/noise is only updated by a small amount. A small amount is an amount that integrates the new solution to the previous ones and updates the solution in a conservative manner. A small amount is an amount which ensures that there are no oscillations (i.e., the integration of a new solution does not lead to a solution which is very far from the previous solutions which might deteriorate the system performance). Therefore, a small amount can be described as the amount that prohibits oscillation but allows an improvement of the past solutions. This can be determined by a computing machine with one or more processors and memory by evaluating the results from using different values of the multiplier t. In an example, updates are made to the solution (or noise) iteratively if the ML system 102 (or the adversary 104) does not converge within a predefined threshold of steps. The predefined threshold may be 10,000 steps or 1,000 steps.

Figure 4:
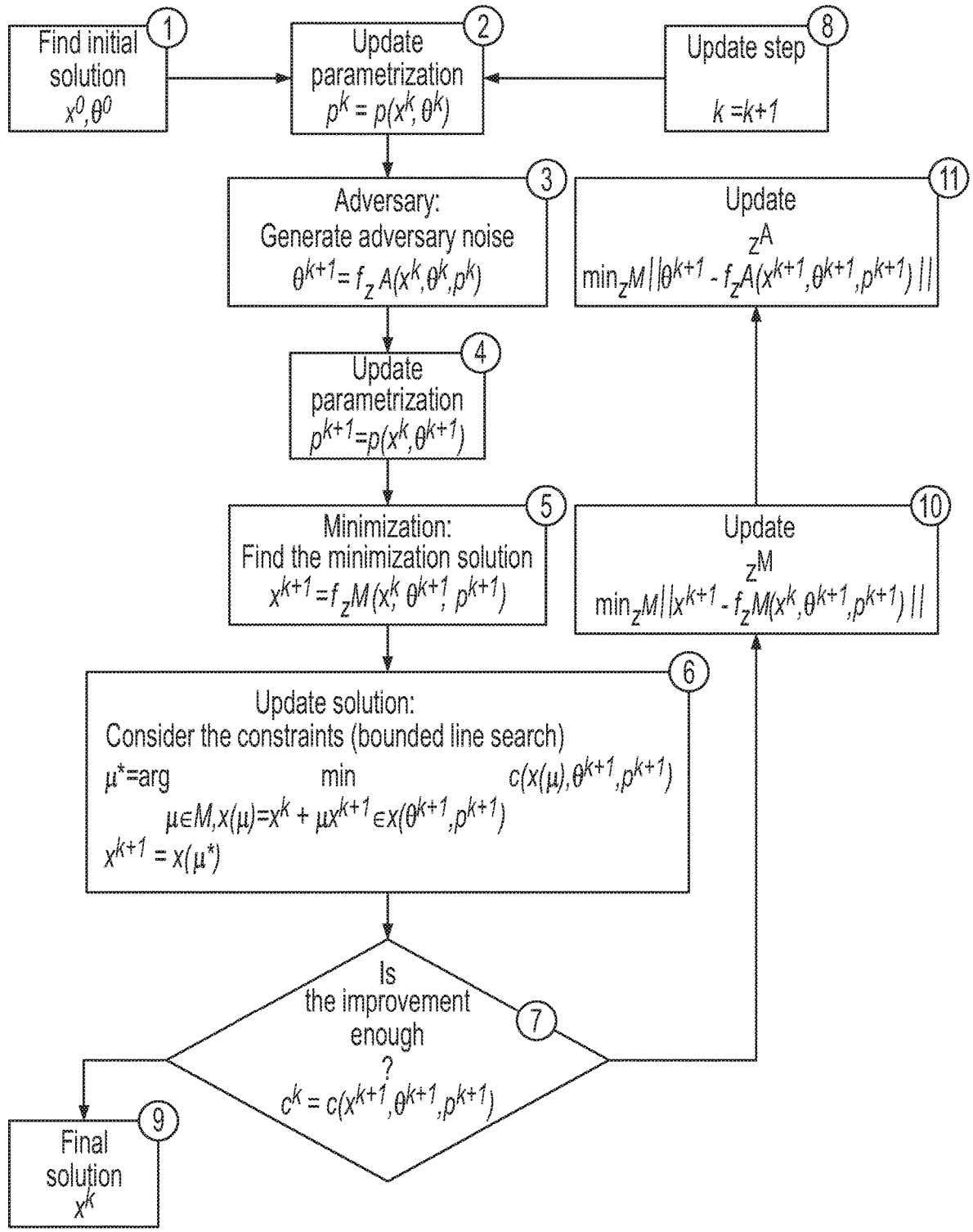
FIG. 4 illustrates a flow diagram according to an embodiment of the invention.

In an embodiment, the minimization function in item (6) and/or the maximization of item (3) of FIG. 3 is a direct function which depends on some parameters ($z^A, z^M$) to be maximized/minimized. The inclusion of $z^A$ and $z^M$ modifies the flow diagram of FIG. 3 to provide that of FIG. 4. Thus, item (3) of FIG. 4 indicates that $\theta^{k+1} = f_A(x^k, \theta^k, p^k)$ and item (5) of FIG. 4 indicates that $x^{k+1} = f_M(x^{k+1}, \theta^{k+1}, p^{k+1})$. $z^A$ and $z^M$ are updated at items (11) and (10), respectively. In FIG. 4, for each iteration, the problem parameters are updated and noise parameters are updated.

In an embodiment, the solution of the problem are the parameters of a Neural Network and the cost is the loss function (e.g. regression loss or classification loss) which depends on the problem.

In an embodiment, machine learning parameters are optimized. In this case, the output is a system that is optimized for the worst case noise. An objective of going through the steps of FIG. 2 is to obtain the parameter set of the machine learning, and the external disturbance is the noise in the input/output data.

Figure 5:
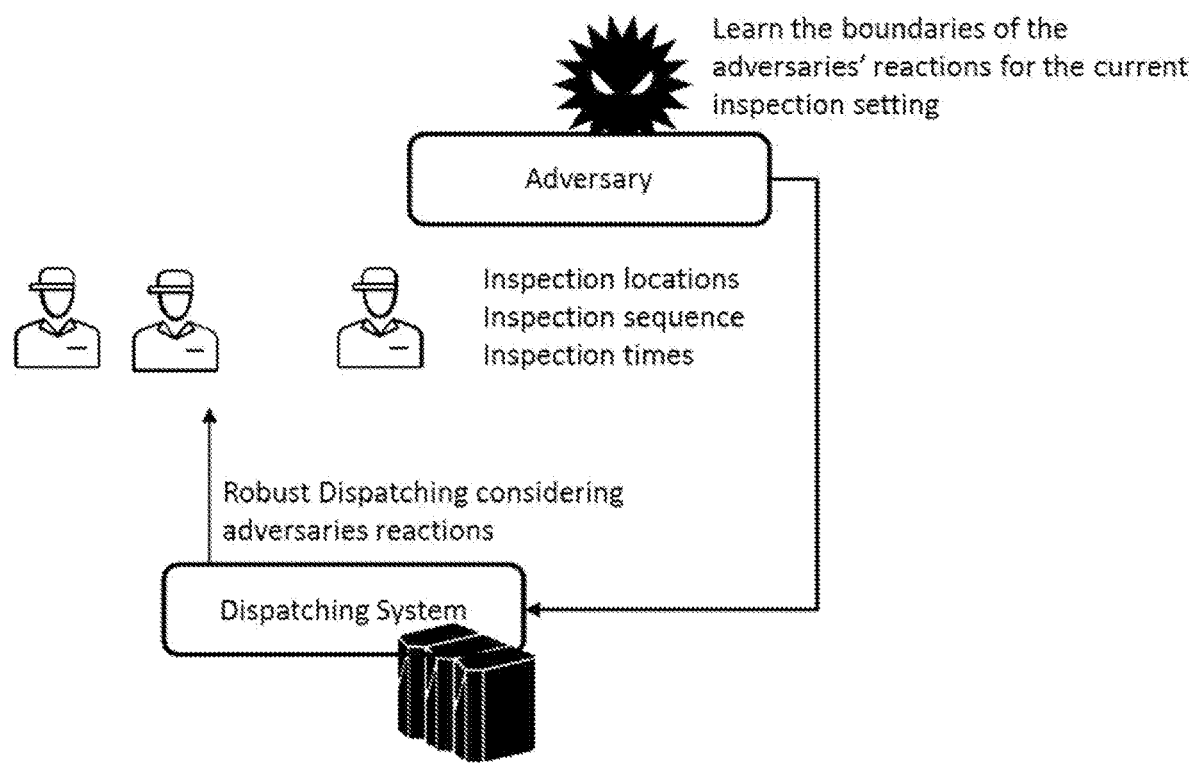
FIG. 5 illustrates an automated dispatching system for inspections according to an embodiment of the invention.

Embodiments of the invention can be applied to fraud detection systems of public transport operations as depicted in FIG. 5. The control system automatically updates the sequence of places where inspectors are dispatched to check for passengers that avoid ticket payments. The adversary 104 (or external disturbance) role is played by the fraud perpetrators (passengers). Passengers that commit fraud change their behavior based on the actual schedule of inspections. For this reason, even optimal inspection schedules do not perform well in practice because the passengers who commit fraud adapt to these schedules very fast (e.g., in a matter of days). Thus, a robust dispatching system of inspectors (as shown in FIGS. 5 and 6) can dispatch the inspectors with the objective to define the sequence, time and the inspected location in such a way that the inspectors' dispatches will be robust to the behavior of the adversaries (i.e., fraud perpetrators).

Figure 6:
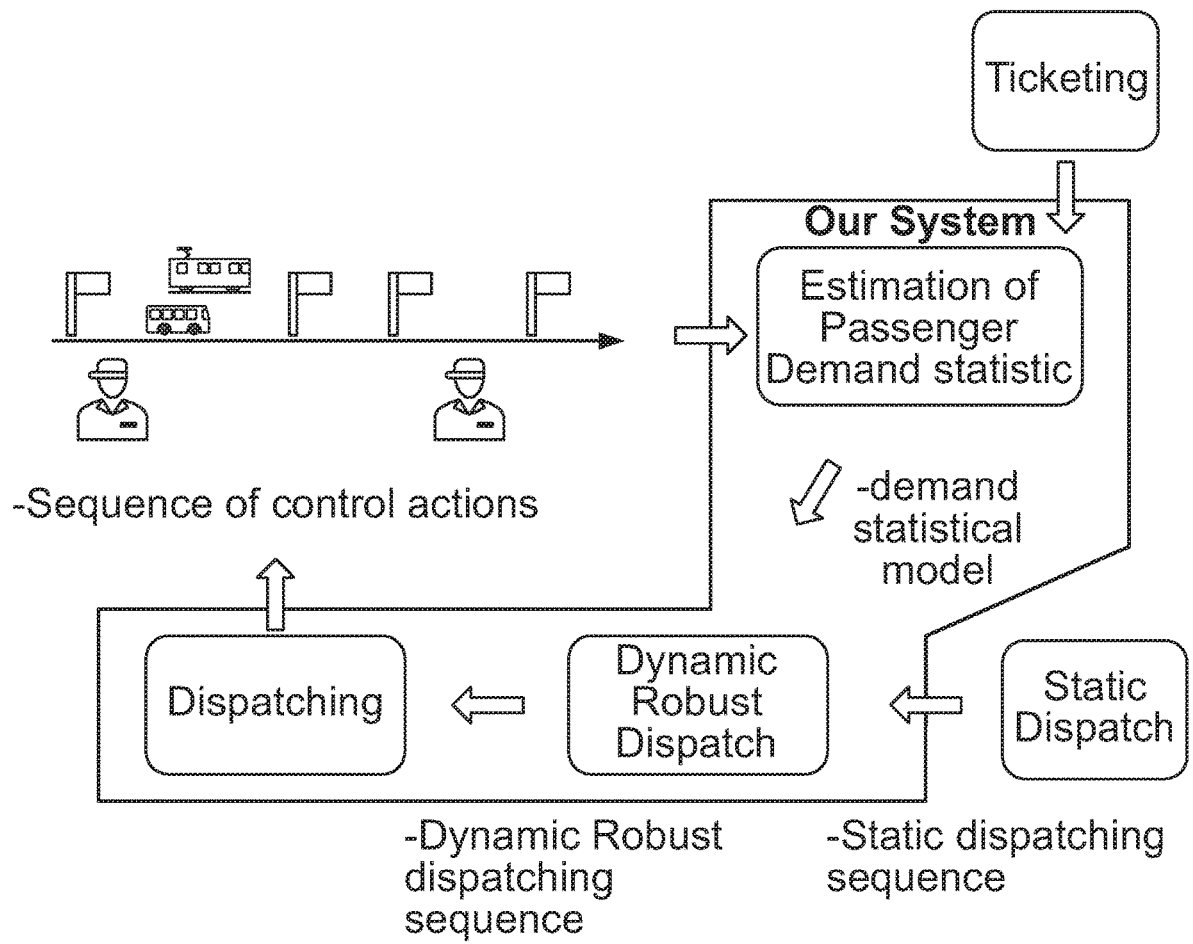
FIG. 6 illustrates a dispatching system according to an embodiment of the disclosure.

The static dispatch of FIG. 6 is an initial solution while the dynamic robust dispatch is an iterative solution using embodiments of the invention. In FIG. 6, there is an actual bussing system and there's a model of the bussing system. The actual bussing system is used to obtain historical data, obtain current data, and inspectors and passengers affect the actual bussing system. The model parameters of the bussing system is determined by the ML system 102 based on current and historical data of the actual bussing system. Using embodiments of the invention, a sequence of inspector dispatches can be determined and improved upon iteratively with the model of the bussing system. Once the sequence of inspector dispatches converge, the solution can be applied to the actual bussing system. That is a sequence of control actions can be provided. These include dispatching inspectors to areas where there may be future fraudulent behavior based on a predicted change in passenger behavior.

Figure 7:
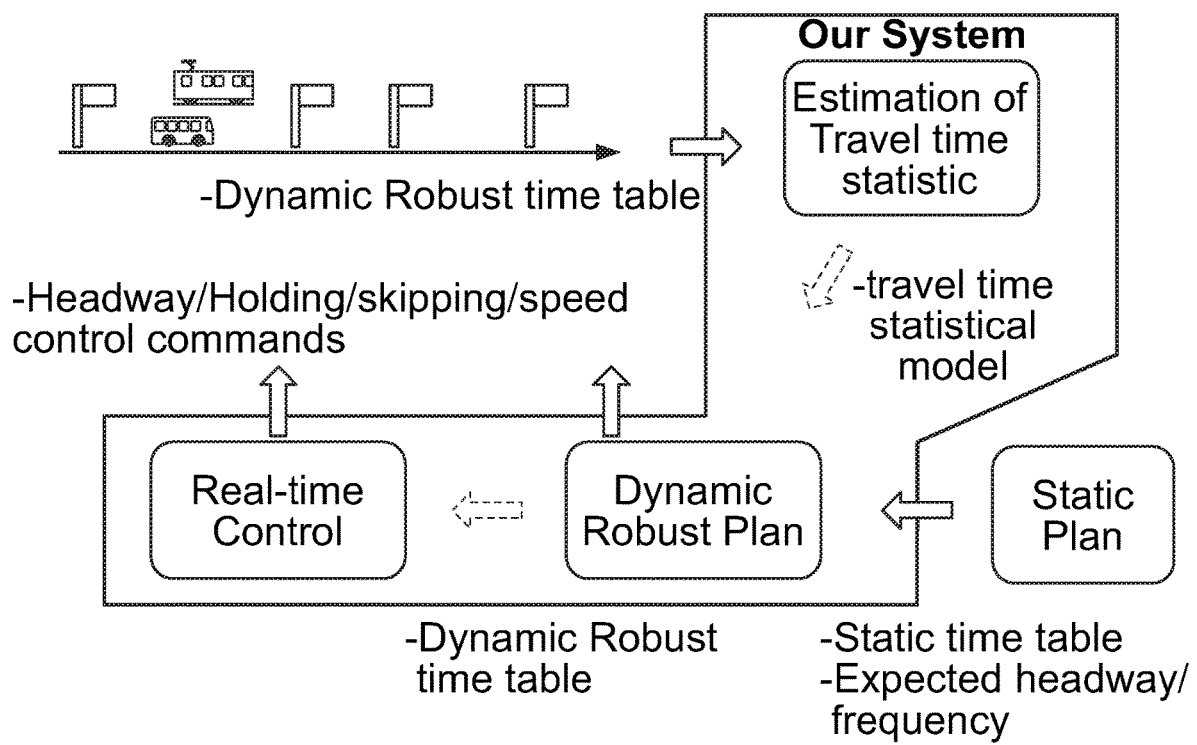
FIG. 7 illustrates computer-aided control public transport control system according to an embodiment of the invention.

Embodiments of the invention can be applied in a computer-aided control public transport control system as depicted in FIG. 7. The computer-aided public transport control system inputs are: (1) The static planning and historical information (including travel time and passenger demand), and (2) The current travel time and location of vehicles. The generated outputs can be: (1) The robust dynamic speed profiling (or planning), (2) The constraints for the realtime control of the public transport vehicles, and (3) The actual control commands to the fleet.

Conventional methods works compute the daily timetables of bus operations with the objective of minimizing the variation of passenger waiting times at stops from the desired waiting time values. Those timetables are computed by modifying the dispatching times of the planned trips based on historical passenger demand and travel time data. However, spatio-temporal demand and travel time variations during the daily operations reduce the practical value of the timetables and the waiting time variation of passengers at stops is way higher than expected. In this embodiment, the computer-aided control system generates a speed profiling for each trip of the day in order to ensure that the variation of passenger waiting times remains low under any circumstances as presented in Table 1 (FIG. 8). Table 1 demonstrates the average waiting time variation of passengers from the planned waiting times in minutes after running 1,000 simulations of the daily operations using different travel times and passenger demand values at each simulation. The performance of the daily operations when using the robust speed profiling was improved by 4.1% on average. This means that over the 1,000 the passengers had to wait, on average, 4.1% less when the robust speed profiling was adopted compared to the case of using an optimal timetable. In addition, the standard deviation of the passenger waiting times at these 1,000 simulations was also improved by 0.5%.

The solutions are the outputs Y of ML system 102 in FIG. 1. Considering the inherent problems (increase of in-vehicle travel times due to bus holdings at stops, the increase of deadheading times due to short-turnings, and the increase of passenger inconvenience due to stop-skipping) of corrective control measures, producing robust timetables that are resilient to operational changes caused by spatio-temporal passenger demand and travel time variations is desirable. Optimizing a timetable assuming deterministic travel times can be counterproductive when actual travel times vary more than 30% from their expected values. The use of automated vehicle location and passenger counting data can be used to cope with the inherent uncertainty of the bus operations with the development of robust approaches for bus scheduling problems. For defining a robust timetable though, a problem objective should be defined. This objective can be the On-Time Adherence (OTA) to the planned schedule, which is typically used for low-frequency, punctuality-based bus lines, or the improvement of the difference between the actual headways among trips and the scheduled ones, which is a more challenging objective typically used for high-frequency, regularity-based bus lines.

Embodiments of the invention, when applied to bus holding, differentiates from previously-discussed conventional methods because they focus on determining robust timetables with uneven dispatching times subject to resource limitations and regulatory constraints. The embodiments consider explicitly the resource limitations and the regulatory constraints as hard constraints of the timetabling problem and model their behavior in the presence of travel time variability during actual operation. The inclusion of hard constraints in the stochastic optimization increases the complexity of the problem at hand especially in the case where a feasible solution does not exist. For this reason, a robust timetable optimization model that is capable of finding an optimal balance between the satisfaction of constraints and the improvement of service reliability via generating timetables which are resilient to travel time and demand variations is proposed.

Embodiments of the invention generate robust timetables that do not require the implementation of numerous corrective actions during the operational phase. This can provide significant benefits to bus operators that are reluctant to deploy dynamic control strategies due to technological limitations or do not want to cause indirect effects to the crew and vehicle schedules. For this reason, the timetabling optimization problem can be decoupled from the frequency settings problem. As a result, the embodiments receive as input already defined frequencies and generate uneven robust dispatching times for daily trips which satisfy the hard constraints of the timetabling problem. The arrival and departure times of bus trips at the stops of the service lines are derived based on the determined dispatching times of the bus trips following the bus movement formulation model as will be discussed below in an embodiment of the invention. This information can then be used to define crew and vehicle schedules following the sequence: (i) frequency setting→(ii) robust timetabling→(iii) crew and vehicle scheduling.

The following is an example embodiment of the invention. Assume 100 daily trips of one bus line and the objective is to minimize the waiting times of passengers at stops. The problem parameters can be the travel times of the trips which can take different values depending on the departure times of these trips (i.e., if a trip departs during peak-hours it will have a higher travel time). The decision variables of the problem can be the departure times of these 100 trips which should be selected in such way that the daily operations are reliable (robust). Initially, for obtaining the values of the problem parameters at step 202, some random values can be selected for the decision variables (i.e., select random departure times for the 100 daily trips). Based on these departure times, the values of the parameters (travel times) are determined. Afterward, new departure times can be computed that minimize the waiting times of passengers at stops (step 204). For these updated departure times, new values for the travel time parameters (i.e., if a trip is forced to depart later its travel time will change as well due to the traffic changes during the day). These new values from step 206 are used for computing new departure time solutions for all daily trips in an iterative manner (steps 208-214) and updating at each step the values of the parameters. That is, if the parameter values are not deterministic and change when the decision variable values change, then they are also subject to disturbance. The worst-case disturbance can be computed and new decision variable values that perform optimally for this disturbance can be determined. Then, for the new decision variables a check is performed again and the process/procedure continues iteratively.

Embodiments of the invention were applied to a bus holding problem. In the bus holding problem, a bus movement formulation was determined. Certain conditions were placed on the bus movement formulation. These included:
  a. Link travel times are time dependent and not trip dependent. They are related to the time of the day when the link is traversed.
  b. Bus overtaking is allowed (no first-in first-out rules for traversing a link).
  c. Dwell times are not inelastic. Instead, they are predominantly affected by the number of passenger boardings and alightings.
  d. The focus is on high-frequency services where the headways are so small that passenger arrivals at stops are random because passengers cannot coordinate their arrivals with the arrivals of buses.
  e. Each bus trip has a capacity limitation based on its type (articulated, double-decker etc.).
  f. All planned trips during the day are operated without stop-skippings, short-runnings or interlinings.
  g. AVL (automatic vehicle location) and APC (automated passenger counters) data are the only available data streams (no information from ILPs or ANPR (automatic number plate recognition) cameras regarding the general traffic at the transport network).

The modeling for the bus problem is extensive so the notation for describing main components of the bus holding problem include:

$5 = \{1, 2, \ldots\}$ denote the bus stops of the line ordered from the first to the last $N = \{1, 2, \ldots\}$ denote the planned daily trips of the bus line ordered from the first to the last.

$X = \{x_{n,s}\}$ where $x_{n,s}$ is the holding time of a bus trip $n \in N$ at stop $s \in S$. The $|N| \times |S|$-valued matrix X includes all the decision variables of the bus holding problem $d_{n,s}(X)$ is the departure time of trip $n \in N$ from stop $s \in S$.

$a_{n,s}(X)$ is the arrival time of bus trip $n \in N$ at stop $s \in S$.

$b_n$ is an $|N|$-valued vector returning the trip ID of the previous bus trip that was operated by the same bus as trip $n \in N$ $t_s(\tau)$ is the expected link travel time between consecutive bus stops s and s+1 is a trip departs from stop $s \in S$ at time r.

$\sigma_s^2(\tau)$ is the expected link travel time variation between consecutive bus stops s and s+1 if a trip departs from stop $s \in S$ at time $\tau$.

$\xi_s(\tau)$ is the random noise of the trip travel time between consecutive bus stops s and s+1 with mean equal to zero and variance $\sigma_s^2(\tau)$.

$h_{n,s}(X)$ is the headway at stop $s \in S$ between bus trip $n+1 \in N$ and its leading bus trip n' in minutes.

$\beta_s^\varrho$ are the boardings in passengers/hour at stop s for hour q which is one of the 24 hours of the day.

$k_{n,s}(X)$ is the dwell time of trip $n \in N$ at stop $s \in S$.

$B_{n,s}(X)$ is the number of boardings of trip $n \in N$ at stop $s \in S$.

$A_{n,s}(X)$ is the number of alightings of trip $n \in N$ at stop $s \in S$.

$l_{n,s}(X)$ is the bus occupancy of trip $n \in N$ at stop $s \in S$.

$O^\varrho = \{O_{i,s}^\varrho\}$ where $\{O_{i,s}^\varrho\}$ denotes the percentage of boarded passengers at stop i<s that alighted at stop s when the boardings at stop i occurred within the hourly period $\varrho$. In other words, $O^\varrho$ is the hourly Origin-Destination (O-D) matrix of the bus passengers.

$\delta_n$ are the originally planned departure times for each trip $n \in N$.

$\omega_s^\varrho$ is the planned passenger waiting time at stop $s \in S$.

$C_n$ is the capacity of bus trip n in number of passengers.

$\varphi$ is the layover time (the required break time for a bus that completed its trip before it starts its next trip) in minutes.

$\mu_l$ is the lowest allowed headway between two consecutive trips at the departure stop in minutes.

$\mu_u$ is the highest allowed headway between two consecutive trips at the departure stop in minutes.

The trajectory of one bus trip is affected by the trajectories of its surrounding bus trips and the bus holding control measures. The departure time of a bus trip n at one bus stop s can be derived using the following recursive expression:

$$d_{n,s}(X) = \begin{cases} \delta_n + x_{n,s} & \text{if } s = 1 \\ d_{n,s}-1(X) + t_s-1(d_{n,s}-1(X)) + \xi_s-1(d_{n,s}-1(X)) + k_{n,s}(X) + x_{n,s} & \text{for every } s \in S - \{1\} \end{cases} \quad (1)$$

The dwell time $k_{n,s}(X)$ of a bus trip n at stop s depends predominantly on the number of boardings because boarding times exceed alighting times in the vast majority of cases. The dwell time was set equal to a minimum value $p_0$ that can range from 2-5 seconds in case of no boardings and it increases by $p_1$=1.5 4.5 seconds for each extra passenger boarding and $p_2$=1-2 seconds for each passenger alighting depending on the fare payment structure. There is a linear relationship between the observed dwell time and the number of boardings and alightings that was expressed as:

$$k_{n,s}(X) = k_n(B_{n,s}(X), A_{n,s}(X)) = p_0 + p_1 B_{n,s}(X) + p_2 A_{n,s}(x) \quad (2)$$

In Eq. 2, $p_0$ is expressed in minutes and $p_1$, $p_2$ in minutes per passenger. The number of passenger boardings at one trip n at stop s is associated with the headway between trip n and its leading trip n-1 at that stop. In other words, the dwell time $k_{n,s}(X)$ was expected to change when the control measures change. Following the assumption of random arrivals of $\beta_s^{(\varrho)}$ passengers/hour at stop s and a headway of $h_{n,s}(x)$ between trips n and n'; then, if the boarding time of passengers $d_{n,s}(X)$ was within the hour $\varrho$ the number of boardings for trip n is expressed as:

$$B_{n,s}(X) = \beta_s^{(\varrho)} \left( \text{passengers/hour} \frac{h_{n,s}(X)(\text{min.})}{60 \ (\text{min.}/\text{hour})} \right) \quad (3)$$

The alightings of trip n at stop s can be also related to the boardings at previous stops using the O-D matrix $O^\varrho$, where $\varrho$ is the time period within which each occurred each boarding. The alightings was expressed as:

$$A_{n,s}(X) = \Sigma_{i=1}^{i=s-1} B_{n,1}(X) O_{i,s}^{(\varrho)} \text{ where } \varrho | a_{n,i}(X) \in \varrho \quad (4)$$

Furthermore, the occupancy of trip n at stop s can be expressed by the passenger flow conservation law as:

$$l_{n,s}(X) = \Sigma_{i=1}^{i=s} B_{n,1}(X) - \Sigma_{i=1}^{i=s} A_{n,1}(X) \quad (5)$$

It was possible to see that the capacity limitation $c_n$ of trip n places an upper bound to the dwell time because the number of boardings at each stop s cannot be higher than $c_n - l_{n,s} - 1(X) + A_{n,s}(X)$. Therefore, Eq. 6 was re-written as:

$$k_{n,s}(X) = p_0 + p_1 \min\{B_{n,s}(X), c_n - l_{n,s} - 1(X) + A_{n,s}(X)\} + p_2 A_{n,s}(x) \quad (6)$$

In addition, the headway $h_{n,s}(X)$ between bus trip n and its leading bus trip n'=P(n), where P (X) is a function that returns the previous trip to trip n at stop s, is:

$$h_{n,s}(X) = a_{n,s}(X) - a_{p(n),s}(X) \quad (7)$$

where $$a_{n,s}(X) = d_{n,s-1}(X) + t_{s-1}(d_{n,s-1}(X)) + \xi_{s-1}(d_{n,s-1}(X)) \forall s \in S/\{1\} \quad (8)$$

Plugging Eq. 6, 44 and 46 into Eq. 1 yields the following bus movement expression:

$$d_{n,s}(X) = \begin{cases} \delta_n + x_{n,s} & \text{if } s = 1 \\ a_{n,s}(X) + k_n(h_{n,s}(X), c_n + x_{n,s} \forall s > 1) \end{cases} \quad (9)$$

The bus movement expression of Eq. 47 is a recursive formula that can return the departure time of each bus trip at each bus stop for a given set of bus holding measures X. Inside Eq. 47 is included a travel time noise term and every time a set of bus holding measures X is applied, the values of the departure times of trips at stops change because the travel time noise generates a new output. Therefore, the bus movement expression can be seen as a simulation of the movement of buses given the random noise inside $a_{n,s}(X)+k_n(h_{n,s}(X), c_n+x_{n,s})$ which can be expressed as:

$$d_{n,s}(X)=d_{n,s}(X)+t_{s-1}(d_{n,s}(X))+\xi_{s-1}(d_{n,s}(X))+p_0+ \\ p_1\min\{B_{n,s}(X),c_n-l_{n,s-1}(X)+A_{n,s}(X)\}+p_2 A_{n,s}(x)+ \\ x_{n,s}, \forall s\in S/\{1\} \quad (10)$$

In a first proposition, it can be shown that the random travel time noise $\xi_{s-1}(d_{n,s}(X))$ has a lower bound.

The proof of the proposition follows that: Let $\xi_{s-1}(d_{n,s}(X))$ be the random travel time noise for the link travel time $t_{s-1}(d_{n,s-1}(X))\in\mathbb{R}$ with mean value equal to zero and variance $\sigma_s^2(d_{n,s-1}(X))$. If $\sigma_s^2(d_{n,s-1}(X))\geq t_{s-1}(d_{n,s-1}(X))$; then, the travel time $t_{s-1}(d_{n,s-1}(X))+\xi_{s-1}(d_{n,s-1}(X))$ can take negative values. However, $t_{s-1}(d_{n,s-1}(X))+t_{s-1}(d_{n,s-1}(X))$ should be always greater than zero; thus, $\xi_{s-1}(d_{n,s-1}(X))$ should be always greater than $-t_{s-1}(d_{n,s-1}(X))$ which is the lower bound of $\xi_{s-1}(d_{n,s-1}(X))$. If $\xi_{s-1}(d_{n,s-1}(X))$ equal to its lower bound; then, the bus is not moving from stop s−1 to stop s due to excessive traffic (zero speed).

Operational constraints were modelled as well. One operational constraint is the bus capacity limit that dictates the level of passenger boardings. For a bus trip n, the number of boardings at a stop s should satisfy the following inequality constraint:

$$B_{n,s}(X)-A_{n,s}(X)+l_{n,s}(X)\leq c_n \quad (11)$$

where the term $l_{n,s-1}(X)$ is the bus occupancy at the previous stop (expressed as number of passengers inside the bus) and $A_{n,s}(X)$ the number of passenger alightings at stop s.

Another operational constraint is the layover time. The layover time dictates that a bus which completed a trip should take at least a break of time p before it starts its next trip. If the previous trip of a bus trip n that was operated by the same bus is the trip $b_n$; then, the layover constraint that considers the effect of the bus holding actions is expressed as:

$$a_{b_n,|S|}(X)+k_n(h_{n,s}(X),c_n)+\varphi\leq d_{n,s=1}(X) \quad (12)$$

The above expression dictates that a bus trip should depart after the previous bus trip operated by the same bus finished its trip plus the dwell and layover times. In the extreme case that no layover time is allowed; then, the constraint of Eq. 12 can be used for ensuring that a next bus trip can start only when the bus has finished its previous trip. The only difference would be that $\varphi=0$ for such case.

Another operational constraint in bus operations is the dispatching headway range which dictates that two successive bus trips should be dispatched from the departure stop in such a way that their departure times are inside a headway range ($\mu_l, \mu_u$). This constraint exists for ensuring that the planned frequency ranges of the bus line are satisfied. For two successive bus trips n'=P(n) and n; this constraint can be expressed as:

$$(\delta_n+x_{n,s}=1)-(\delta_{P(n)}+x_{P(n),s=1})\geq\mu_l \quad (13)$$

and $$(\delta_n+x_{n,s}=1)-(\delta_{P(n)}+x_{P(n),s=1})\geq\mu_u \quad (14)$$

In addition to operational constraints, short and long term effects of bus holding strategies should be considered. The short-term effect of a prolonged bus holding is the passenger dissatisfaction if the bus is slowed down or is held at the stop for a long time period. The time period was up to 2 minutes. For modeling purposes, a bus holding threshold of $x_{n,s}^{max}$ minutes for each trip n at each stop $s\in S\setminus\{1\}$ yields the following expression:

$$0\leq x_{n,s}\leq x_{n,s}^{max}, \forall n\in N \text{ and } s\in S\setminus\{1\} \quad (15)$$

Especially at the departure stop, s=1, the bus holding bounds do not apply because at that stop there are more degrees of freedom. For example, a bus trip can start earlier than planned or prolong its start for several minutes. Therefore, especially for stop s=1, there are no bus holding time limits and any dispatching time deviation from the planned departure of the trip is permitted.

Apart from the short-term effects of bus holding that are related to its practical implementation, there are also long-term effects that affect the future bus operations. By definition, bus holding postpones the arrival of buses to the terminal and this results in the postponement of the dispatch of the next trip that is operated by the same bus causing a domino effect. Postponing the completion of a bus trip for normalizing passenger waiting times is generally allowed—as it is the sole purpose of bus holding—however, the daily operations cannot be postponed further than a certain level. For instance, contractual commitments with the bus drivers may not allow postponing the daily operations up to a certain time $T^{last}$. This time $T^{last}$ dictates that the planned departure of the last trip of the day $\delta_{|N|}$ should not be postponed by more than $T^{last}$ minutes from the planned one and can be expressed in the form of a constraint as:

$$d_{|N|,s=1}(X)\leq\delta_{|N|}+T^{last} \quad (16)$$

This last constraint ensures that the bus holding control measures are not allowed to postpone the entire schedule of the daily operations further than a pre-defined time $T^{last}$. $T^{last}$ is the available extra slack time during daily operations, and its duration is decided in practice through a mutual agreement between the bus operator and the bus drivers.

So far, the bus holding problem and several considerations and constraints have been provided. Reliable bus holding will thus be introduced. At each bus stop s there is a target passenger waiting time $w_s$. Ideally, if the link travel times between consecutive stops and the dwell times do not vary one can come close to a bus holding strategy that satisfies the target passenger waiting time at each stop. Nevertheless, the fluctuation of the bus travel and dwell times cannot guarantee the effect of the bus holding strategy on satisfying the target passenger waiting times which is formulated by the following expression:

$$\mathcal{J}(X) = \frac{1}{|S|(|N|-1)}\sum_{s\in S}\sum_{n\in N\setminus\{1\}}\left\|\frac{h_{n,s}(X)}{2}-w_s\right\| \quad (17)$$

Eq. 17 assumes that the waiting time of passengers that had to board at a trip n at stop s is equal to half the headway between bus trip n and its leading bus n' given that the passengers arrivals at stop s are random. $\mathcal{J}(X)$ expresses the average Excess Waiting Time (EWT) that a passenger of that line is expected to experience. The above expression, can take the following form:

$$\mathcal{J}(X) = \frac{1}{|S|(|N|-1)}\sum_{s\in S}\sum_{n\in N\setminus\{1\}}\left\|\frac{1}{2}(d_{n,s}(X)-d_{n',s}(X))-w_s\right\| \quad (18)$$

where $d_{n,s}(X)$ and $d_{n',s}(X)$; are computed by the recursive expression of Eq. 47.

Applying only bus holding measures cannot guarantee zero excess waiting time for the passengers, and the bus operators should not anticipate perfectly normalized headways even if there is no travel time noise or dwell time punctuation.

In a first theorem, bus holdings cannot guarantee zero excess waiting times ($\mathcal{J}(X)=0$) even in the case of no travel time noise and no dwell time punctuation.

The proof of the theorem follows that: consider the ideal case of no travel time noise $$\sigma_s^2(\tau) \forall n \in N$$

and $s \in S$. Also consider at dwell times $k_{n,s}(X)=k$ which are not affected by the passenger demand and the headways. If two consecutive bus trips n, n+1 depart from the stop s+1 at times $d_{n,s=1}$ and $d_{n+1,s=1}$ such that the target waiting at stop s=2 is satisfied; then, $(d_{n+1,s=1}(X)+t_{n+1,s=1}(d_{n+1,s=1}(X)))-(d_{n,s=1}(X)+t_{n,s=1}(d_{n,s=1}(X)))=2w_{s=2}$. The bus holding measures applied at stop s=2 are $x_{n,s=2}$ and $x_{n+1,s=2}$ respectively. Those holding times take values from the bound set (0, T) and the waiting time of passengers that board on trip n+1 at stop s=3 is half of the headway $2w_{s=3}+(x_{n=1,s=2}+t_{n+1,s=2}(d_{n+1,s=1}(X)+k+x_{n+1,s=2})-(d_{n,s=1}(X)+k+x_{n,s=2}))$. Therefore, if the target passenger waiting time at stop s=3 Is $w_3$ the travel time of bus trip n from stop s=2 to s=3 cannot be always higher than $2(w_3-w_2)-(x_{n+1,s=2}-x_{n,s=2})+t_{n+1,s=2}(d_{n+1,s=1}(X)+k+x_{n+1,s=2})$ where the maximum value of $x_{n+1,s=2}-x_{n,s=2}=T$. ℝ

However, this claim is not true because $t_{n,s=2}(d_{n,s=1}(X)+k+x_{n,s=2}) \in \mathbb{R}$ and it can be higher than $2(w_3-w_2)-T+t_{n+1,s=2}(d_{n+1,s+1}(X)+k+x_{n+1,s+2}) \forall x_{n,s=2}, \forall x_{n+1,s=2}$.

The first theorem proves that passenger excess waiting times cannot be reduced to zero if practical implementation limitations bound the maximum possible holding time to any positive value $T<+\infty$. This indicates that in the extreme case where the target waiting times at two successive stops are the same, and the travel time of the leading bus is always higher than the travel time of the following bus plus the maximum holding time, T, the target waiting time at the second stop cannot be achieved. For this reason, transport operators should accept the existence of excess waiting times at stops if they are not willing to apply prolonged holdings that are impractical in real-world settings and can postpone the completion of the daily operations.

In robust optimization, since travel time noise is present, each time the same bus holding solution X is implemented, Eq. 17 is expected to return a different $\mathcal{J}(X)$ value. Robust design seeks the bus holding strategy, X, that minimizes the worst-case cost of this stochastic problem as expressed below:

$$\min_X \max_\Xi \mathcal{J}(X, \Xi) = \frac{1}{|S|(|N|-1)} \sum_{s \in S} \sum_{n \in N\setminus\{1\}} \left\| \frac{h_{n,s}(X, \Xi)}{2} - w_s \right\| \quad (19)$$

where $\Xi = \{\xi_{n,s} = \xi_s(d_{n,s}(X)) \sim N(0, \sigma_s(d_{n,s}(X))) | \xi_s(d_{n,s}(X)) \geq -t_s(d_{n,s}(X))\}$.

Therefore, the robust bus holding optimization problem can take the form of Eq. 20 below:

$$\min_{X=\{x_{ns}\}} \max_{\Xi=\{\xi_{ns}\}} \mathcal{J}(X, \Xi) = \frac{1}{|S|(|N|-1)} \sum_{s \in S} \sum_{n \in N\setminus\{1\}} \frac{1}{1+\sigma_{ns}} \left\| \frac{h_{n,s}}{2} - w_s^{\ell_{ns}} \right\|^2 +$$

$$\gamma_J \frac{1}{|S||N|} \sum_{n \in N, s \in S} (|x_{ns}| + |\xi_{ns}|^2)$$

-continued subject to $l_{ns} \leq c_n, \forall n \in N, s \in S\setminus\{1\}$ $a_{b_n,|S|} + k_n(h_{n,s}, c_n) + \varphi \leq d_{n,s=1}, \forall n \in N$ $\mu_l \leq (\delta_n + x_{n,s=1}) - (\delta_{P(n)} + x_{P(n),s=1}) \leq \mu_u, \forall n \in N$ $x_{n,s}^{min} \leq x_{n,s} \leq x_{n,s}^{max}, \forall n \in N, \forall s \in S$ $d_{|N|,s=1} \leq \delta_{|N|} + T^{last}, s=1, n=|N|$ $|\xi_{n,s}| < \gamma_\sigma \sigma_{ns}, \forall n, \forall s$ $B_{n,s} = \beta_s^{\ell_{ns}} h_{ns}, \forall, \forall s$ $A_{n,s} = \sum_{s'=1}^{s} o_{s',s}^{\ell_{ns'}} B_{n,s'}, \forall n, \forall s$ (20)

$l_{n,s} = l_{ns-1} + (B_{ns} - A_{ns}), \forall n \forall s$ $h_{n,s} = a_{ns} - a_{p(n)s}, \forall n, \forall s$ $a_{ns} = d_{ns-1} + t_{ns-1} + \xi_{ns-1}, \forall, \forall s-1$ $d_{ns} = a_{ns} + k_{ns} + x_{ns}, \forall n, \forall s > 1$ $d_{ns} = \delta_n + x_{ns}, \forall n, \forall s = 1$ $k_{ns} = k_n(h_{ns}, c_n), \forall n, \forall s$ $t_{ns} = t_n(d_{ns}), \forall n, \forall s$ $\sigma_{ns} = \sigma_n(d_{ns}), \forall n, \forall s$ $\sigma_{ns} = \rho(d_{ns}), \forall n, \forall s$ In Eq. 20, p(d), $k_n(h, c)$, $t_n(d)$, $\sigma_n(d)$, P(n) are given functions, and $c_n$, $\beta_n^\rho$, $o_{s',s}^\rho$, $w_n$, $\delta_n$, $\mu_u$, $\mu_l$, $\varphi$, $x_{n,s}^{min}$, $x_{n,s}^{max}$, $T^{last}$, $\gamma_J$, $\gamma_\sigma$ are input problem dependent parameters. $t_{ns}$, $k_{ns}$, $d_{ns}$, $a_{ns}$, $h_{ns}$, $l_{ns}$ are internal problem variables, while $x_{ns}$, $\xi_{ns}$ are the unknown and free variables of the optimization problem representing the solution of the bus holding and the pessimistic travel time noise.

The unknowns are $x=[x_{ns}, t_{ns}, k_{ns}, d_{ns}, a_{ns}, h_{ns}, l_{ns}]$.

The parameters, $O=\{(c_n, \beta_n^\rho, o_{s',s}^\rho, w_n^\rho, \delta_n, \mu_u, \mu_l, \varphi, x_{n,s}^{min}, x_{n,s}^{max} T^{last}, \gamma_J, \gamma_\sigma, \xi_{ns}, b_n\}$.

The functions are $F=\{\rho(d), k_n(h, c), t_n(d), \sigma_n(d), P(n)\}$.

Eq. 20 is not convex because the embedded travel times and the dwell times are non-convex functions.

Minimum slack time was modelled. Slack time is a buffer time that is assigned to a trip, and it corresponds to the maximum bus holding implementation. A large slack time allows better regulation of the service (i.e. EWT), but at the expense of efficiency. A large slack time means that the bus will not be dispatched before this time expires. Thus, a consideration can be made for the problem of defining a minimum slack time that will account for the worst case scenario and reformulate the problem with the new variable, the slack time. Alternatively a probabilistic approach can also be used. If $x^*(\xi)$ is the solution to the bus holding minimization problem as a function of the noise (, then the optimization problem involves:

$$\min_x f_\xi(x) \quad (21)$$

$$\text{subject to } \begin{array}{l} g_\xi(x) = 0 \\ h_\xi(x) \geq 0 \end{array}$$

where probability distribution of the minimization solution is given by $$x^*(\xi) \sim N(\mu_x, \sigma_x^2) \quad (22)$$

where $$\mu_x = E_\xi\{x^*(\xi)\} \quad (23)$$

$$\sigma_x^2 = E_\xi\{|x^*(\xi) - \mu_x|^2\}$$

where $E_\xi\{z\}=\int\Omega_\xi\, p_\xi(\zeta)z(\zeta)d\zeta$, $\Omega_\xi$ is the domain of $\xi$ and $p_\xi(\zeta)\zeta N(0, \sigma_\xi^2)$ is the probability distribution of the travel time noise. Eq. 23 can be computed numerically.

The robust problem may be solved using alternate optimization or sequential quadratic programming. Using alternate optimization, assume an initial guess of the bus holding solution $X^{k=0}$. One approach to solving the optimization problem is to alternate the solution of the optimization problem while fixing the travel times and the dwell times of the current solution, $X^{k=0}$, and then update both of them when the new solution $X^{k=1}$ is computed. Fixing the travel and dwell times stabilizes the problem while searching for the optimal solution, thus accelerating the convergence to the optimal solution. Define the travel time matrix, which contains the travel time given the current bus holding solution as $$T^{k=0}=\{t_{n,s}=t_n(d_{n,s}(X^{k=0}))\} \quad (24)$$

Also given the current holding solution, the dwell times can be fixed by defining the dwell time matrix $$K^{k=0}=\{k_n(h_{n,s}(X^{k=0}),c_n)\} \quad (25)$$

The optimization function in Eq. 20 can then be re-written as $$\min_X \max_\Xi \mathcal{J}(X, \Xi) = \frac{1}{|S|(|N|-1)} \sum_{s\in S}\sum_{n\in N\setminus\{1\}} \left\|\frac{h_{n,s}(X, \Xi, T^{k=0}, K^{k=0})}{2} - w_s\right\| \quad (26)$$

and the objective is to find a new bus holding solution $X^{k=k+1}$ that minimizes the worst-case cost of the stochastic problem for those fixed travel time and dwell time matrices.

Above, the travel time noise was shown to have a lower bound that prevents negative travel times. Given the travel time matrix $T^{k=0}$ that corresponds to the solution $X^{k=0}$, this lower bound becomes $\xi_s(d_{n,s}(X))\geq -t_{n,s}$ $\forall n\in N$ and $s\in S$. In addition, the travel time noise is not infinite because, even if there is a major traffic accident, the vehicles will move at some point. Therefore, to avoid ending up in a stalemate, a travel time upper bound, $\xi^{upper}$, is introduced, and the following optimization problem is solved to obtain the worst-case travel time noise:

$$\max_\Xi \mathcal{J}(X^{k=0}, \Xi) = \frac{1}{|S|(|N|-1)} \sum_{s\in S}\sum_{n\in N\setminus\{1\}} \left\|\frac{h_{n,s}(X^{k=0}, \Xi, T^{k=0}, K^{k=0})}{2} - w_s\right\| \quad (27)$$

where $\Xi=\{\xi_{n,s}=\xi_s(d_{n,s}(X^{k=0}))\sim N(0, \sigma_s(d_{n,s}(X^{k=0})))|\xi^{upper}\geq \xi_s(d_{n,s}(X^{k=0}))\geq t_{n,s}\}$.

Since each element of the matrix 8 receives stochastic values from the normal distribution, the worst-case travel noise $\Xi$ for the bus holding solution $X^{k=0}$ can be computed by running a large set of $R=\{1, 2, \ldots\}$ bus movement simulations using Eq. 47, assuming $X^{k=0}$, $T^{k=0}$ and $K^{k=0}$. At each simulation $r\in R$, each element of the travel time noise matrix $\Xi$ is sampled from the normal distribution and at the end of the simulation the score of the $\mathcal{J}(X^{k=0}, \Xi^r)$ function is evaluated. Then, after finishing all simulations, the sampled travel time noise $\Xi^{r*}$ for which $$\mathcal{J}(X^{k=0},\Xi^{r*})\geq \mathcal{J}(X^{k=0},\Xi^r)\forall r\in R \quad (28)$$

is selected as the worst-case travel noise for the solution $X^{k=0}$; thus, $\Xi^{k=0}=\Xi^{r*}$.

Afterwards, the next bus holding solution $X^{k=k+1}$, that minimizes the following optimization problem which re-writes Eq. 49 using the standard form is determined:

$$\min_X \mathcal{J}(X, \Xi^{k=0}) = \frac{1}{|S|(|N|-1)}\sum_{s\in S}\sum_{n\in N\setminus\{1\}}\left\|\frac{h_{n,s}(X, \Xi^{k=0}, T^{k=0}, K^{k=0})}{2} - w_s\right\| \quad (29)$$

subject to $$C_{1,\ldots,|N||S-1|}(X) = c_n = B_{n,s}(X) + A_{n,s}(X) - l_{n,s-1}(X) \geq 0 \,\forall n\in N,$$
$$s\in S\setminus\{1\}$$

$$C_{|N||S-1|+1,\ldots,|N||S-1|+|N|}(X) =$$
$$d_{n,s=1}(X) = a_{b_n|S|}(X) - k_{n,s}^{k=0} - \varphi \geq 0 \,\forall n\in N$$

$$C_{|N||S-1|+|N|+1,\ldots,|N||S-1|+2|N|}(X) =$$
$$\mu_u - (\delta_n + x_{n,s=1}) + (\delta_{P(n)} + x_{P(n),s=1}) \geq 0 \,\forall n\in N$$

$$C_{|N||S-1|+2|N|+1,\ldots,|N||S-1|+3|N|}(X) =$$
$$(\delta_n + x_{n,s=1}) - (\delta_{P(n)} + x_{P(n),s=1}) - \mu_l \geq 0 \,\forall n\in N$$

$$C_{|N||S-1|+3|N|+1}(X) = \delta_{|N|} + T^{last} - d_{|N|,s=1}(X) \geq 0$$

$$0 \leq x_{n,s} \leq x_{n,s}^{max}, \,\forall n\in N, s\in S\setminus\{1\}$$

In Eq. 29, $C_1, \ldots, _{|N||S-1|+2|N|+1}$ are the constraints of the problem. If E is the set of equality constraints, then $E=\emptyset$, whereas the set of inequality constraints is $I=\{1, 2, 3 \ldots, |N||S-1|+3|N|+1\}$ and the total number of constraints is $m=I+E=|N||S-1|+3|N|+1$.

For finding the optimal bus holding solution with numerical optimization, new iterates of the initial guess $X^{k=0}$ are generated by solving inequality constraint Quadratic sub-problems (QP) at each iterate. The method of Sequential Quadratic Programming (SQP) is selected for that task given the non-linearity in the objective function.

SQP generates new iterates of the initial guess, $X^{k=0}$, by solving inequality constraint quadratic sub-problems at each iterate r. The idea behind the SQP solution method is to model the bus holdings of the current iterate, $X^r=X^{k=0}$, by a quadratic program (QP) sub-problem and then use the minimizer of this sub-problem to define a new iterate of bus holdings, $X^{r+1}$, until convergence.

Given that the boundary constraints are inequality constraints and both the objective function and the constraints are continuously differentiable at a point $X_r$, then if $X_r$ is a local optimum and the regularity conditions are satisfied at this point there is a Lagrange multiplier vector $\lambda_r$ with m elements such that the first order necessary Karush-Kuhn-Tucker (KKT) conditions are satisfied:

Stationarity $\nabla_x \mathcal{L}(X_r,\lambda_r)=0$

Primal Feasibility: $C(X_r)\geq 0, \forall i\in I$

Dual Feasibility: $\lambda_{r,i}\geq -, \forall i\in I$

Complementarity: $\lambda_{r,i}C_{r,i}(X_r)=0, \forall i\in E\cup I$ $\quad(30)$ where $$\mathcal{L}(X,\lambda) = \mathcal{J}(X) - \Sigma_{i\in I}\lambda_i C(X) \quad (31)$$

is the Lagrangian function $=\mathcal{L}: \mathbb{R}^{L+m}\to\mathbb{R}$ of the constrained frequency settings NLP (nonlinear programming) and at the initial iteration, an initial guess of the Lagrange multipliers $\lambda_{r=0}$ should be also provided.

To model the current headway solution $X_r$ by a quadratic programming (QP) sub problem and then use the minimizer of this sub-problem to define a new iterate $X_{r+1}$ until convergence, a linearization of the constraints is required since QP problems tackle only linear constraints. This can be modeled by using the current iteration values of the planned headways vector $X_r$ and the Lagrange multipliers $\lambda_r$ for nding the minimizer p which is a vector of |L| elements by solving the following QP sub-problem:

$$\min_{p \in \mathbb{R}^l} z(h_k) + \nabla_z(h_k)^T p + \frac{1}{2} p \nabla_{hh}^2 \mathcal{L}(h_k, \lambda_k) p \quad (32)$$

$$\text{subject to } \nabla_{c_i}(h_k)^T p + c_i(h_k) \geq 0, \, i \in I$$

$$\nabla_{c_i}(h_k)^T p + c_i(h_k) = 0, i \in E = \emptyset$$

where $J(h)^T = [\nabla_{c_1}(h), \nabla_{c_2}(h), \ldots, \nabla_{c_m}(h)]$ is the Jacobian matrix of the constraints vector with |L|×m elements and $\nabla_{hh}^2 \mathcal{L}(h_k, \lambda_k)$ is the Hessian matrix of the Lagrange function with |L|×|L| elements. After solving the above inequality QP problem the iterate values are updated $(h_{k+1}, \lambda_{k+1}) = (h_k + p_k, \lambda_{k+1})$ where $p_k$ and $\lambda_{k+1}$ are the solution and the corresponding Lagrange multiplier of the inequality QP. Iterations then continue until convergence according to the algorithm shown in FIG. 9.

The Hessian, Jacobian and other first and second order derivatives can be numerically approximated with the use of finite differences in an adaptive manner, coupled with Richardson's extrapolation methodology to provide a maximally accurate result. The SQP algorithm convergence criterion can be the step direction stagnation (i.e., reach at an inequality QP sub-problem where its solution returns $p_k = \{0, \ldots, 0\}$ which indicates that there is no better direction than the current one).

All those inequality QP sub-problems can be solved with the well-known active-set method where the equality constraints are always active and the active-set is updated at any iteration by solving an equality QP where different inequality constraints are considered as active.

The original problem can be considered a stochastic optimization, where the expected outcome of the original cost function is considered:

$$\min_x E_{y \sim Y}\{f(x, y)\} \quad (33)$$

$$\text{subject to } g(x, y) = 0$$

$$h(x, y) \leq 0$$

where $E_y$ is the expected value operator and y~Y is the underlying distribution of the external variability. A possible algorithm to solve the previous problem is:

$$x^{k+1} = \Pi_{X(y^k)}(x^k - \gamma_k \nabla_x f(x^k, y^k))$$

$$y^k \sim Y \quad (34)$$

and $\Pi_x$ is the projection in $X(y)=\{x:g(x,y)=0 \wedge h(x,y) \leq 0\}$. The previous method can be improved upon by introducing a penalty function (i.e. mirror descent): $V(x,z)=\|x^2\|-\|y\|^2 + \langle z, (x-z)\rangle$ $$x^{k+1} = \arg\min_{x \in X(y^k)} (V(x, x^k) - \langle \gamma_k \nabla_x f(x^k, y^k), x \rangle) \quad (35)$$

$$y^k \sim Y$$

where $\langle x, z \rangle$ is the inner product between x, z.

In an embodiment, robust optimization solution can be determined using adjustable multistage optimization. Consider the robust optimization problem:

$$\min_x \max_y f(x, y) \quad (36)$$

$$\text{subject to } g(x,y)=0$$

$$h(x,y) \leq 0$$

This problem can be re-written as a minimization problem:

$$\min_{t, \forall y} t \quad (37)$$

$$\text{subject to } g(x,y)=0$$

$$h(x,y) \leq 0$$

$$f(x,y) \leq t$$

This problem is still intractable in the general sense since the variable y is a free variable. Adjustable Multi-stage Optimization is a strategy to include dependence between the free variable y and the control variable x using some rule $x=X_i(y)$, where $X_i(y)$ is some rule to be determined in the new formulation. For example, the rule function can depend on the time of execution.

Define the rule functions $\{X_i(y): i=1, \ldots, N_{ns}\}$ as the affine rule that consider only the noise on the current link ns and the past trips up to M and the next stops, up to L, so the control action $x_{ns} = X_{ns}(\xi_{ns}) = \Sigma_{m=0}^{M,L} z_{ns,ml} \xi_{n-m,s+l}$. In this case the new variable are the set to matrices $z_{ns,ml}$.

In an embodiment, robust alternate min-max solution method is used for solving.

$$\mathcal{J}(X, T) = E_{n,x,\xi}\left\{\left|\frac{h_{n,s}(X, T)}{2} - w_x\right|\right\} \quad (38)$$

where the travel time that a bus is experiencing on a specific bus stop $h_{n,s}(X, T)$ does not depend any more on the bus holding solution. The cost can be extended with a regularization term and a stabilization term and explicitly define the noise term of the travel time:

$$\mathcal{J}(X, T) = E_\Xi\{\mathcal{J}(X, T, \Xi)\} \quad (39)$$

$$\mathcal{J}(X, T, \Xi) = E_{n,s}\left\{w_{n,s}\left|\frac{h_{n,s}(X, T, \Xi)}{2} - w_s\right|\right\} + \alpha_x\|X\|_1^2 + \alpha_\Xi\|\Xi\| \quad (40)$$

The robust optimization problem can then be defined for example as the min/max, i.e.

$$\min_X \max_\Xi \mathcal{J}(X, T, \Xi) \quad (41)$$

or the min of the average expected travel time condition $$\min_X E_\Xi \mathcal{J}(X, T, \Xi) \quad (42)$$

In solving thus, alternatively set $T=T(X^{k-1})$ with the previous solution $X^{k-1}$ and then solve for $X^k$. The process is then iterated after for example $e_k = |X^k - X^{k-1}|$ is small enough and does not vary. One approach to solve the min/max problem is also to iterate between the solution of the minimization function and the maximization of the cost function. The approach is to consider stochastic gradient where at each iteration a gradient step is taken with respect to a local maximized cost function. The local maximum is computed by generating for example bounded error, evaluating the cost function and selecting the maximum among the generated samples. In finding the local optimum, the random stochastic gradient descent can be used, where a small noise is added to the gradient. Gradient can be computed analytically or numerically.

$$x_{t+1} = x^t - \alpha[\nabla f(x^t) + r] \quad (43)$$

The gradient of the headway can be determined as $$\nabla_X \mathcal{J}(X,T,K,\Xi) = E_{n,s}\{w_{n,s}\nabla_X h_{n,s}(X,T,K,\Xi)\}$$

where $$h_{n,s}(X) = a_{n,s}(X) - a_{P(n),s}(X) \quad (44)$$

$$K = \{k_n(h_{n,s}(X), c_n)\}_{n,s} \quad (45)$$

$$a_{n,s}(X) = d_{n,s-1}(X) + t_{n,s-1} + \xi_{n,s-1} \forall s \in S/\{1\} \quad (46)$$

and $$d_{n,s}(x) = \begin{cases} \delta_n + x_{n,s} & \text{if } s = 1 \\ a_{n,s}(X) + k_n(h_{n,s}(X), c_n) + x_{n,s}, & \forall s > 1 \end{cases} \quad (47)$$

Based on the previous equation:

$$a_{n,s} = a_{n,s-1} + k_{n,s-1} + x_{n,s} + t_{n,s-1} + \xi_{n,s-1} \forall s \in S/\{1\} \quad (48)$$

The terms $k_{n,s-1}$, $t_{n,s-1}$, $\xi_{n,s-1}$ are kept fixed in one iteration, $$\nabla_{x_{n',s}} a_{n,s} = \nabla_{x_{n',s}} a_{n,s-1} + \nabla_X x_{n,s} = \nabla_{x_{n',s}} a_{n,s-1} + \zeta_{n-n',s-s'} \quad (49)$$

where $\zeta_{n,s} = 1$, when n=0 and s=0; 0 otherwise. It follows that $$\nabla_{x_{n',s}} a_{n,s} = \Sigma_{s'=1}^s \zeta_{n-n',s-s'} = s-1, \text{ if } s'=s, n'=n \quad (50)$$

The gradient of the cost function is then $$\nabla_X a_{n,s} = \nabla_X a_{n,s} - \nabla X a_{n',s} = (s-1)-(s-1) = 0 \quad (51)$$

When solving the optimization problem with a real network, with hundreds of trips and tents or more bus station, the variable size grows and the optimization problem tends not to converge, e.g., by hitting the maximum number of iterations. A heuristic can be used to find improving solutions that eventually converge to the optimal solution. Two concepts are introduced: selection mask and mask probabilities.

Figure 10:
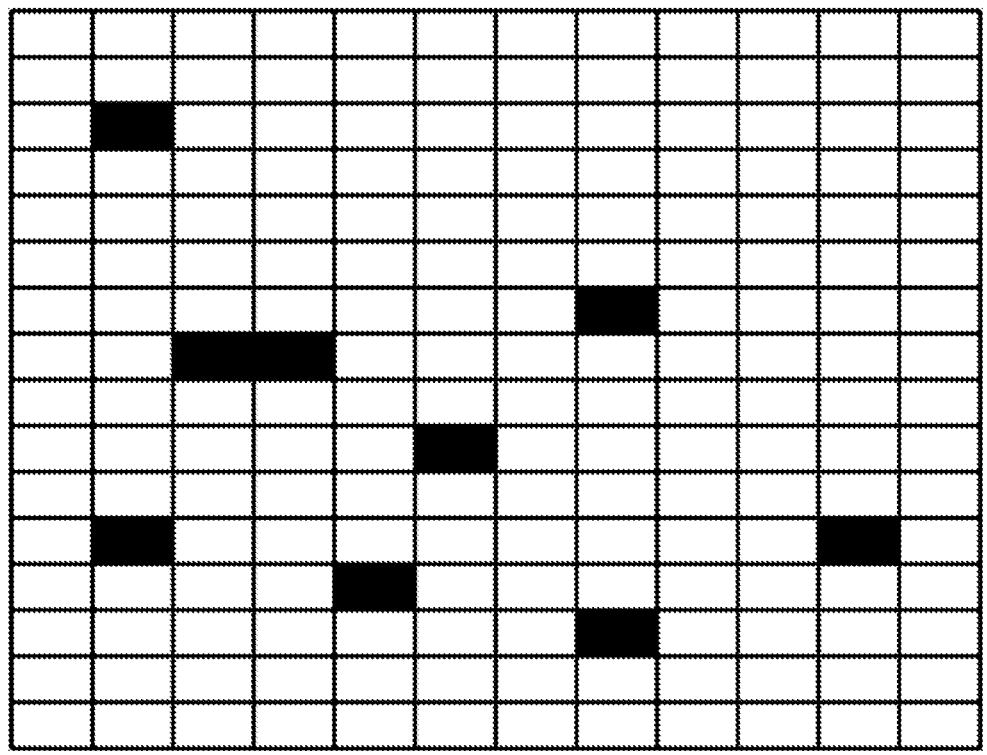
FIG. 10 illustrates an example of a selection mask according to an embodiment of the invention.

The selection mask selects the bus holding variable that will be solved in the optimization cycle, each element of the mask is either 0 or 1. FIG. 10 illustrates an example of a selection mask.

In mask probabilities, for each variable or each mask entry, a probability is defined that measures the rate of success of the variable, where the rate of success is the number of change in the variable value. The variance of the variable is also introduced; the variance indicates how stable is the value of the variable when selected. The number of times the variable has been selected is also introduced. Additionally, the reduction in the cost function of the current variable is associated with the violation of the constraint, as well if the maximum number of iteration is reached. All previously defined statistics are used to select the variable to be optimized.

The selection problem is then stated as a Multi-Arm-Bandit problem, so each variable represents an arm and selecting the arm or variable that improves the solution is of interest. The selection is based on:
 a. The more the variable reduces the cost function the more it is selected.
 b. There is a small but not null probability to select the variable.
 c. The probability is initialized as 1.
 d. Maximum number of variables allowed for each iteration is equal to K where K=1 and proceeds till $K^{max}$ $m_{n,s}$, $p_{ns}$, $s_{ns}$, $c_{ns}$, $v_{sn}$, $n_{ns}$ are defined as the mask, the probability, the standard deviation of the cost, the mean cost, the mean number of violation and the total number of selection of the variable $x_{ns}$. $p_{min}$ is a low probability to still select the variable independent of its expected return cost. k is the current iteration. FIG. 11 illustrates pseudocode for mask updates, variable selection, and probability updates according to an embodiment of the invention.

In an embodiment, another approach to solve the optimization problem with large problem is to reduce the total number of variables. This can be done by selecting a set of key stations that are included in the optimization problem, leaving the others out. The key station set is generated recursively. This can be performed by first selecting one station at time and solving the optimization problem which is in the size of only the number of trips. A good station to select is a station that provides a lower total cost. Then a second station is added. Then a check is performed with the previous station to determine which one provides the lower cost. This process is repeated till either the reduction of the minimum cost is decreasing or until the complexity of the problem is too high.

In an embodiment, line search can be used for solutions stabilization. When updating the solution the effect of the worst case noise can be smoothed. There can be a different solution of the worst case noise that provides a problem where the solution that is minimal for some worst case noise is not the robust solution of the problem. To alleviate this convergence problem, a small step is taken toward the new solution. This small step is called the inertia. Additionally, the new solution should not violate the constraints of the problem. Suppose the following problem is being solved:

$$\min_x f(x) \quad (52)$$

subject to $g(x) = 0$ $h(x) \geq 0$

The solutions before and after the minimization problem are $x^k$ and $x^*$. Define $$x(\mu) = x^k + \mu(x^* - x^k) \quad (53)$$

then select $x^{k+1} = x(\mu^*)$, as the solution of this new problem $$\min_{\mu \geq \mu_{min}} \mu \quad (54)$$

subject to $g(x) = 0$ \quad (55)

$h(x) \geq 0$ \quad (56)

This last minimization is performed with a line search.

Embodiments of the invention provide a method for determining robust solution to machine learning problems where the disturbance is bounded in some measurable sense. The solution is found iteratively by means of an external disturbance system that includes the constraints of the problem, while the bounds of the external disturbance are updated at each step using information from the solution. Embodiments of the invention provide educated estimation (with machine learning or simulation-based or external disturbance noise modeling) of parameter values at each iterative step that fixes their values and a line search approach for updating the solution and the parameter values for fast convergence and oscillation avoidance.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for robust machine learning of a target system, comprising:
    determining a type of optimization problem and parametrization for solving the optimization problem;
    determining a disturbance budget based on a disturbance modeling;
    defining the optimization problem based on the disturbance budget;
    determining an initial integrated solution for iteratively solving the optimization problem;
    providing iteratively an input data to the target system, wherein the input data at a current iteration is an integrated solution of a previous iteration;
    generating iteratively a disturbance, wherein the disturbance at the current iteration is generated according to the disturbance budget and the input data at the current iteration;
    generating iteratively an optimal solution of the target system, wherein the optimal solution of the target system at the current iteration is generated based on the disturbance and the input data at the current iteration; and
    integrating the input data at the current iteration with the optimal solution of the target system at the current iteration to obtain an integrated solution of the current iteration.

2. The method according to claim 1, further comprising: providing a final solution.

3. The method according to claim 1, wherein the type of optimization problem is a maximization problem or a minimization problem and the optimization problem is defined with constraints and a system model.

4. The method according to claim 1, wherein the disturbance is generated based on a variation of the input data at the current iteration.

5. The method according to claim 4, wherein the variation of the input data is determined through supervised learning.

6. The method according to claim 1, wherein the disturbance budget follows a Gaussian distribution.

7. The method according to claim 1, wherein the target system is a set of machine learning parameters being optimized for a worst case scenario.

8. The method according to claim 1, wherein the disturbance comprises noise in the input data.

9. The method according to claim 1, wherein the target system is a set of neural network parameters and the optimization problem is a minimization of a loss function.

10. The method according to claim 1, wherein the disturbance is based on rules that link the integrated solution of a previous iteration to an input noise.

11. The method according to claim 1, applied in a computer-aided public transport control system, wherein the input data comprises static planning and historical information including travel time and passenger demand and current travel time and location of vehicles.

12. The method according to claim 11, wherein integrated solutions comprise robust dynamic speed profiling or planning, constraints for real-time control of public transport vehicles, and actual control commands to the public transport vehicles.

13. The method according to claim 1, wherein integrated solutions are obtained using a line search approach.

14. The method according to claim 1, wherein oscillation avoidance is comprised in obtaining the integrated solution at the current iteration.

15. A robust control system for robust machine learning of a target system, the control system comprising one or more processors which, alone or in combination, are configured to provide for execution of the following steps:
    determining a type of optimization problem and parametrization for solving the optimization problem;
    determining a disturbance budget based on a disturbance modeling;
    defining the optimization problem based on the disturbance budget;
    determining an initial integrated solution for iteratively solving the optimization problem;
    providing iteratively an input data to the target system, wherein the input data at a current iteration is an integrated solution of a previous iteration;
    generating iteratively a disturbance, wherein the disturbance at the current iteration is generated according to the disturbance budget and the input data at the current iteration;
    generating iteratively an optimal solution of the target system, wherein the optimal solution of the target system at the current iteration is generated based on the disturbance and the input data at the current iteration; and
    integrating the input data at the current iteration with the optimal solution of the target system at the current iteration to obtain an integrated solution of the current iteration.

* * * * *